(12) United States Patent
Zhang et al.

(10) Patent No.: US 12,409,865 B2
(45) Date of Patent: Sep. 9, 2025

(54) AUTONOMOUS DRIVING METHOD AND APPARATUS

(71) Applicant: HUAWEI TECHNOLOGIES CO., LTD., Guangdong (CN)

(72) Inventors: Weize Zhang, Shenzhen (CN); Zhiwei Gao, Beijing (CN); Xinyu Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 249 days.

(21) Appl. No.: 18/181,282

(22) Filed: Mar. 9, 2023

(65) Prior Publication Data

US 2023/0211809 A1    Jul. 6, 2023

Related U.S. Application Data

(63) Continuation of application No. PCT/CN2021/116422, filed on Sep. 3, 2021.

(30) Foreign Application Priority Data

Sep. 10, 2020  (CN) .......................... 202010947784.4

(51) Int. Cl.
*B60W 60/00* (2020.01)
*B60W 30/095* (2012.01)

(52) U.S. Cl.
CPC .... *B60W 60/0027* (2020.02); *B60W 30/0956* (2013.01); *B60W 2520/105* (2013.01); *B60W 2554/4042* (2020.02)

(58) Field of Classification Search
CPC ......... B60W 60/0027; B60W 30/0956; B60W 2520/105; B60W 2554/4042;
(Continued)

(56) References Cited

U.S. PATENT DOCUMENTS 9,008,890 B1 *  4/2015  Herbach .............. G05D 1/0297
                                                340/436
9,227,632 B1 *  1/2016  Lee ................... B60W 30/0956
(Continued)

FOREIGN PATENT DOCUMENTS

CN         110316185 A      10/2019
CN         110869866 A       3/2020
CN         111428905 A  *    7/2020 ............. G01D 21/02

OTHER PUBLICATIONS

Ordonez et al., "The virtual wall approach to limit cycle avoidance for unmanned ground vehicles," Robotics and Autonomous Systems, vol. 56, Issue 8, Aug. 31, 2008, 8 pages.

(Continued)

*Primary Examiner* — Abby Y Lin
*Assistant Examiner* — Kayla R. Doros
(74) *Attorney, Agent, or Firm* — Fish & Richardson P.C.

(57) ABSTRACT

The present application discloses autonomous driving methods and apparatuses that may be applied to an intelligent vehicle and an autonomous driving vehicle. An example method includes: obtaining a motion status of an obstacle; determining a location of a towing point and a speed of the towing point based on the motion status of the obstacle, where both the location of the towing point and the speed of the towing point are continuous functions of the motion status of the obstacle; and obtaining expected acceleration of an ego vehicle based on the location of the towing point and the speed of the towing point.

19 Claims, 14 Drawing Sheets

(58) Field of Classification Search
CPC . B60W 2554/4041; B60W 2554/4043; B60W 2554/801; B60W 2554/802; B60W 2720/106; B60W 30/0953; B60W 30/14; B60W 30/16; B60W 60/0011; B60W 30/09; B60W 30/025; B60W 30/095; B60W 30/143; B60W 30/165; B60W 30/162; B60W 2554/4045; B60W 2554/00; B60W 2554/80; B60W 30/18163; B60W 50/0097; B60W 60/00274; G08G 1/166; G08G 1/167; G08G 1/096791; G05D 1/0214; G05D 1/0088; G05D 1/0246; G05D 1/0223; G06V 20/58

See application file for complete search history.

(56) References Cited

U.S. PATENT DOCUMENTS

| 10,717,438 | B2* | 7/2020 | Nagae | G06V 20/588 |
|---|---|---|---|---|
| 2010/0030474 | A1* | 2/2010 | Sawada | B62D 15/029 |
| | | | | 701/301 |
| 2020/0142417 | A1* | 5/2020 | Hudecek | B60W 30/0953 |
| 2020/0172122 | A1* | 6/2020 | Mimura | B60W 60/0055 |
| 2020/0180633 | A1* | 6/2020 | Wu | B60W 30/18163 |
| 2020/0241530 | A1* | 7/2020 | Caveney | B60W 60/0016 |

OTHER PUBLICATIONS

Morellas et al., "Collision Avoidance for Highway Vehicles Using the Virtual Bumper Controller," Proceedings of 1998 IEEE International Conference on Intelligent Vehicles, Dec. 1998, 8 pages.

* cited by examiner

AUTONOMOUS DRIVING METHOD AND APPARATUS

CROSS-REFERENCE TO RELATED APPLICATIONS

This application is a continuation of International Application No. PCT/CN2021/116422, filed on Sep. 3, 2021, which claims priority to Chinese Patent Application No. 202010947784.4, filed on Sep. 10, 2020. The disclosures of the aforementioned applications are hereby incorporated by reference in their entireties.

TECHNICAL FIELD

This application relates to the field of autonomous driving, and more specifically, to an autonomous driving method and an apparatus.

BACKGROUND

Artificial intelligence (AI) is a theory, a method, a technology, or an application system that simulates, extends, and expands human intelligence by using a digital computer or a machine controlled by a digital computer, to sense an environment, obtain knowledge, and obtain an optimal result by using the knowledge. In other words, artificial intelligence is a branch of computer science and attempts to understand essence of intelligence and produce a new intelligent machine that can react in a manner similar to human intelligence. Artificial intelligence is to study design principles and implementation methods of various intelligent machines, so that the machines have perceiving, inference, and decision-making functions. Researches in the artificial intelligence field include a robot, natural language processing, computer vision, decision-making and inference, human-computer interaction, recommendation and search, an AI basic theory, and the like.

Autonomous driving is a mainstream application in the artificial intelligence field. The autonomous driving technology relies on collaboration of computer vision, a radar, a monitoring apparatus, a global positioning system, and the like, to implement autonomous driving of a motor vehicle without human intervention. An autonomous driving vehicle uses various computing systems to assist in transporting passengers from one location to another location. Some autonomous driving vehicles may require some initial or continuous input from operators (such as navigators, drivers, or passengers). The autonomous driving vehicle allows an operator to switch from a manual operation mode to an autonomous driving mode or a mode between the manual operation mode and the autonomous driving mode. Because the autonomous driving technology does not require a human to drive the motor vehicle, driving errors caused by people can be effectively avoided in theory, traffic accidents can be reduced, and road transportation efficiency can be improved. Therefore, the autonomous driving technology attracts increasing attention.

To keep safety and comfort during the cruise of the autonomous driving vehicle, an appropriate real-time speed constraint is needed. Through arrangement of an untouchable virtual wall, the appropriate speed constraint may be generated. For example, for a vehicle already in a lane of an ego vehicle, the vehicle is generally used as a following object of the ego vehicle, and the virtual wall may be set at the rear of the following object of the ego vehicle, so that the ego vehicle keeps a safe distance from the virtual wall based on the appropriate speed constraint. For vehicles in adjacent lanes, the virtual wall has a boundary location. For example, when a horizontal distance between another vehicle and the ego vehicle is less than a specified threshold, the virtual wall is usually set at the rear of the another vehicle. When the horizontal distance between the another vehicle and the ego vehicle is greater than or equal to the specified threshold, the virtual wall is usually not set. However, when the ego vehicle detects that a location of the another vehicle changes, a horizontal distance between the ego vehicle and the another vehicle may change, and may change around the specified threshold. In this case, the virtual wall may be unstable and may change between being set and being not set. In addition, because of perceived noise, there is an error in the location of the another vehicle detected by the ego vehicle. If the horizontal distance between the ego vehicle and the another vehicle changes around the specified threshold, the virtual wall is unstable. In addition, for a static obstacle near the ego vehicle, for example, a parking vehicle on a roadside, when a horizontal distance between the ego vehicle and the obstacle is small, due to impact such as perceived noise, the horizontal distance between the obstacle detected by the ego vehicle and the ego vehicle may change around a specified threshold, and consequently the virtual wall is unstable. When the virtual wall is set, a towing point corresponding to the virtual wall exists correspondingly, and is used to tow the ego vehicle to move forward, and provide a speed constraint for the ego vehicle, for example, the ego vehicle decelerates. When the virtual wall is not set, a towing point that provides a speed constraint for the ego vehicle does not exist correspondingly, and the ego vehicle moves at a constant speed or accelerates. When the virtual wall is unstable, speed jumps occur, and the ego vehicle frequently accelerates and decelerates, affecting user experience.

Therefore, how to reduce vehicle speed jumps during autonomous driving and improve user experience becomes a technical problem that urgently needs to be resolved.

SUMMARY

This application provides an autonomous driving method and an apparatus, to reduce vehicle speed jumps and improve user experience.

According to a first aspect, an autonomous driving method is provided. The method includes: obtaining a motion status of an obstacle, where the motion status of the obstacle includes a location of the obstacle and a speed of the obstacle; determining a location of a towing point and a speed of the towing point based on the motion status of the obstacle, where the speed of the towing point indicates an expected speed of an ego vehicle at the location of the towing point, the location of the towing point is a continuous function of the motion status of the obstacle, and the speed of the towing point is a continuous function of the motion status of the obstacle; and obtaining expected acceleration of the ego vehicle based on the location of the towing point and the speed of the towing point.

In this embodiment of this application, both the location of the towing point and the speed of the towing point are the continuous functions of the motion status of the obstacle. After the obstacle is detected or the motion status of the obstacle is obtained, a speed constraint can be continuously provided for the vehicle. The location and the speed of the towing point continuously change with the motion status of the obstacle, to avoid a sudden change of the location and the speed of the towing point caused by impact such as perceived noise. Therefore, frequent acceleration or deceleration of the vehicle can be avoided. This improves user experience.

In addition, after the obstacle is detected or the motion status of the obstacle is obtained, the speed constraint can be continuously provided for the vehicle. In this way, in a dangerous scenario, the ego vehicle can respond as soon as possible, to avoid collision or impact on user experience. For example, after the obstacle is detected or the motion status of the obstacle is obtained, the location and the speed of the towing point are determined, and the speed constraint is continuously provided for the vehicle, instead of being provided only in a case of a short vehicle distance. In this way, the vehicle may decelerate in advance before a dangerous scenario occurs. This improves passenger safety.

For example, the obstacle may include an object such as another vehicle, a bicycle, or a pedestrian.

The obstacle is located in a front area of the ego vehicle. The front area of the ego vehicle includes a side front area of the ego vehicle, or may be understood as a side front area outside a target travel route of the ego vehicle.

For example, the obstacle may be another vehicle parked on a roadside, another vehicle running in an adjacent lane, or a pedestrian crossing a road.

Both the location of the towing point and the speed of the towing point are the continuous functions of the motion status of the obstacle. The location of the towing point and the speed of the towing point continuously change with the motion status of the obstacle. Because the motion status of the obstacle continuously changes with time, the location of the towing point and the speed of the towing point also continuously change with time. In other words, the location and the speed of the towing point do not change. This avoids frequent acceleration or deceleration of the ego vehicle.

With reference to the first aspect, in some implementations of the first aspect, the method further includes: generating a virtual wall based on the location of the obstacle, where a status of the virtual wall includes a penetrable state and an impenetrable state.

According to the solution of this embodiment of this application, the status of the virtual wall includes the penetrable state and the impenetrable state. The virtual wall may present different states at different intrusion degrees. For example, for an obstacle with a low intrusion degree, the virtual wall is in the penetrable state, and the ego vehicle may perform preventive deceleration. For an obstacle with a high intrusion degree, the virtual wall is in the impenetrable state, to ensure driving safety of the ego vehicle, so that taking over by a driver in an emergency is avoided, or sudden deceleration is avoided. This improves user experience.

The penetrable state means that the ego vehicle can penetrate through the virtual wall in a running process. The impenetrable state means that the ego vehicle cannot penetrate through the virtual wall in a running process or needs to keep a specific safe distance from the virtual wall.

With reference to the first aspect, in some implementations of the first aspect, the virtual wall continuously exists.

In an existing solution, when an ego vehicle detects that an obstacle changes near a critical location of an added wall, the ego vehicle changes between setting a virtual wall and not setting a virtual wall. Consequently, the ego vehicle frequently accelerates or decelerates. In this embodiment of this application, the virtual wall may be set since the obstacle is detected. The virtual wall continuously exists, so that the continuous speed constraint can be provided for the ego vehicle. This avoids frequent acceleration or deceleration of the ego vehicle.

With reference to the first aspect, in some implementations of the first aspect, the method further includes: obtaining a target travel route of the ego vehicle. The determining a location of a towing point and a speed of the towing point based on the motion status of the obstacle includes: determining the location of the towing point and the speed of the towing point based on the motion status of the obstacle and the target travel route of the ego vehicle.

With reference to the first aspect, in some implementations of the first aspect, the location of the towing point is represented by a following distance.

With reference to the first aspect, in some implementations of the first aspect, an update frequency of the expected acceleration is greater than or equal to 20 Hz.

With reference to the first aspect, in some implementations of the first aspect, the determining a location of a towing point and a speed of the towing point based on the motion status of the obstacle includes: calculating a collision risk degree based on the motion status of the obstacle; and determining the location of the towing point and the speed of the towing point based on the collision risk degree.

The collision risk degree may indicate an intrusion degree of the obstacle, namely, a degree of intrusion into the target travel route of the ego vehicle.

The collision risk degree may alternatively be referred to as a proximity risk degree. The collision risk degree may indicate a degree of proximity between the obstacle and the ego vehicle. Alternatively, it may be understood that the collision risk degree indicates a risk of collision between the obstacle and the ego vehicle. A higher collision risk degree indicates a higher collision risk.

With reference to the first aspect, in some implementations of the first aspect, when the collision risk degree is less than a first threshold, the status of the virtual wall is the penetrable state; or when the collision risk degree is greater than or equal to a first threshold, the status of the virtual wall is the impenetrable state.

With reference to the first aspect, in some implementations of the first aspect, the speed of the obstacle includes a tangential speed of the obstacle. The determining the location of the towing point and the speed of the towing point based on the collision risk degree includes: determining a penetration speed of the ego vehicle based on the collision risk degree, where the penetration speed of the ego vehicle has a negative correlation with the collision risk degree; and determining the speed of the towing point based on the tangential speed of the obstacle and the penetration speed of the ego vehicle.

A higher collision risk degree indicates a lower penetration speed of the ego vehicle.

With reference to the first aspect, in some implementations of the first aspect, the determining the location of the towing point and the speed of the towing point based on the collision risk degree includes: when the collision risk degree is greater than or equal to the first threshold, the speed of the towing point is less than or equal to the tangential speed of the obstacle.

With reference to the first aspect, in some implementations of the first aspect, the calculating a collision risk degree based on the motion status of the obstacle includes: calculating a collision indicator based on the motion status of the obstacle, where the collision indicator includes at least one or more of the following: distance to lane, time to lane, and distance to vehicle; and calculating the collision risk degree based on the collision indicator.

With reference to the first aspect, in some implementations of the first aspect, the method further includes: controlling a vehicle-mounted display to display a location relationship between the ego vehicle, the obstacle, and the virtual wall.

According to a second aspect, an autonomous driving apparatus is provided. The apparatus includes: an obtaining unit, configured to obtain a motion status of an obstacle, where the motion status of the obstacle includes a location of the obstacle and a speed of the obstacle; and a processing unit, configured to: determine a location of a towing point and a speed of the towing point based on the motion status of the obstacle, where the speed of the towing point indicates an expected speed of an ego vehicle at the location of the towing point, the location of the towing point is a continuous function of the motion status of the obstacle, and the speed of the towing point is a continuous function of the motion status of the obstacle; and obtain expected acceleration of the ego vehicle based on the location of the towing point and the speed of the towing point.

In this embodiment of this application, both the location of the towing point and the speed of the towing point are the continuous functions of the motion status of the obstacle. After the obstacle is detected or the motion status of the obstacle is obtained, a speed constraint can be continuously provided for the vehicle. The location and the speed of the towing point continuously change with the motion status of the obstacle, to avoid a sudden change of the location and the speed of the towing point caused by impact such as perceived noise. Therefore, frequent acceleration or deceleration of the vehicle can be avoided. This improves user experience.

In addition, after the obstacle is detected or the motion status of the obstacle is obtained, the speed constraint can be continuously provided for the vehicle. In this way, in a dangerous scenario, the ego vehicle can respond as soon as possible, to avoid collision or impact on user experience. For example, after the obstacle is detected or the motion status of the obstacle is obtained, the location and the speed of the towing point are determined, and the speed constraint is continuously provided for the vehicle, instead of being provided only in a case of a short vehicle distance. In this way, the vehicle may decelerate in advance before a dangerous scenario occurs. This improves passenger safety.

With reference to the second aspect, in some implementations of the second aspect, the processing unit is further configured to generate a virtual wall based on the motion status of the obstacle, where a status of the virtual wall includes a penetrable state and an impenetrable state.

With reference to the second aspect, in some implementations of the second aspect, the virtual wall continuously exists.

With reference to the second aspect, in some implementations of the second aspect, the obtaining unit is further configured to obtain a target travel route of the ego vehicle. The processing unit is specifically configured to determine the location of the towing point and the speed of the towing point based on the motion status of the obstacle and the target travel route of the ego vehicle.

With reference to the second aspect, in some implementations of the second aspect, the location of the towing point is represented by a following distance.

With reference to the second aspect, in some implementations of the second aspect, an update frequency of the expected acceleration is greater than or equal to 20 Hz.

With reference to the second aspect, in some implementations of the second aspect, the processing unit is specifically configured to: calculate a collision risk degree based on the motion status of the obstacle; and determine the location of the towing point and the speed of the towing point based on the collision risk degree.

With reference to the second aspect, in some implementations of the second aspect, when the collision risk degree is less than a first threshold, the status of the virtual wall is the penetrable state; or when the collision risk degree is greater than or equal to a first threshold, the status of the virtual wall is the impenetrable state.

With reference to the second aspect, in some implementations of the second aspect, the speed of the obstacle includes a tangential speed of the obstacle. The processing unit is specifically configured to: determine a penetration speed of the ego vehicle based on the collision risk degree, where the penetration speed of the ego vehicle has a negative correlation with the collision risk degree; and determine the speed of the towing point based on the tangential speed of the obstacle and the penetration speed of the ego vehicle.

With reference to the second aspect, in some implementations of the second aspect, the processing unit is specifically configured to: when the collision risk degree is greater than or equal to the first threshold, the speed of the towing point is less than or equal to the tangential speed of the obstacle.

With reference to the second aspect, in some implementations of the second aspect, the processing unit is specifically configured to: calculate a collision indicator based on the motion status of the obstacle, where the collision indicator includes at least one or more of the following: distance to lane, time to lane, and distance to vehicle; and calculate the collision risk degree based on the collision indicator.

With reference to the second aspect, in some implementations of the second aspect, the apparatus further includes a display unit. The display unit is configured to display a location relationship between the ego vehicle, the obstacle, and the virtual wall.

It should be understood that extensions, definitions, explanations, and descriptions of related content in the first aspect are also applicable to same content in the second aspect.

According to a third aspect, an autonomous driving apparatus is provided. The apparatus includes: a memory, configured to store a program; and a processor, configured to execute the program stored in the memory. When the program stored in the memory is executed, the processor is configured to perform the method in any one of the first aspect and the implementations of the first aspect.

According to a fourth aspect, a vehicle is provided. The vehicle includes the autonomous driving apparatus in any one of the second aspect and the implementation of the second aspect.

According to a fifth aspect, a computer-readable medium is provided. The computer-readable medium stores program code used by a device for execution, and the program code is used to perform the method in any implementation of the first aspect.

According to a sixth aspect, a computer program product including instructions is provided. When the computer program product is run on a computer, the computer is enabled to perform the method in any implementation of the first aspect.

According to a seventh aspect, a chip is provided. The chip includes a processor and a data interface. The processor reads, through the data interface, instructions stored in a memory, to perform the method in any implementation of the first aspect.

Optionally, as an implementation, the chip may further include the memory. The memory stores the instructions, the processor is configured to execute the instructions stored in the memory, and when executing the instructions, the processor is configured to perform the method in any implementation of the first aspect.

The foregoing chip may be specifically a field programmable gate array (field programmable gate array, FPGA) or an application-specific integrated circuit (application-specific integrated circuit, ASIC).

DESCRIPTION OF EMBODIMENTS

The following describes the technical solutions in embodiments of this application with reference to the accompanying drawings in embodiments of this application.

The solutions in embodiments of this application may be applied to an autonomous driving scenario.

In a driving process of an autonomous driving vehicle or an intelligent vehicle, a driving target of an ego vehicle is to drive in a safe and comfortable manner. When there is a collision risk, collision needs to be avoided.

For example, a driving road includes an urban open structured road, an expressway, or a rural road.

When there is an obstacle around the vehicle, a collision risk may exist. For example, in a vehicle following or cut-in (cut-in) scenario, a target of the ego vehicle is to complete vehicle following, braking, or the like in a safe and comfortable manner. The obstacle includes a moving object and a static obstacle.

Figure 1:
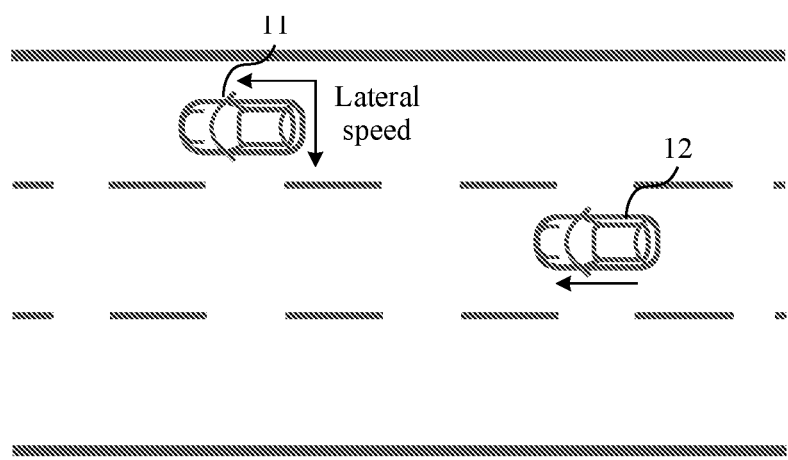
FIG. 1 is a schematic diagram of an application scenario according to an embodiment of this application.

FIG. 1 shows an application scenario according to an embodiment of this application. Another vehicle 11 is located in a side front area of an ego vehicle 12, and the another vehicle 11 has not intruded into a lane of the ego vehicle, but has an intrusion tendency. For example, as shown in FIG. 1, the another vehicle 11 has a lateral speed. In other words, it may be understood that there is a tendency of intruding into the lane of the ego vehicle. The lateral speed is a speed in a direction perpendicular to a lane direction. The solution in this embodiment of this application may be applied to this scenario. This avoids frequent acceleration or deceleration of the ego vehicle 11, and improves user experience.

Figure 2:
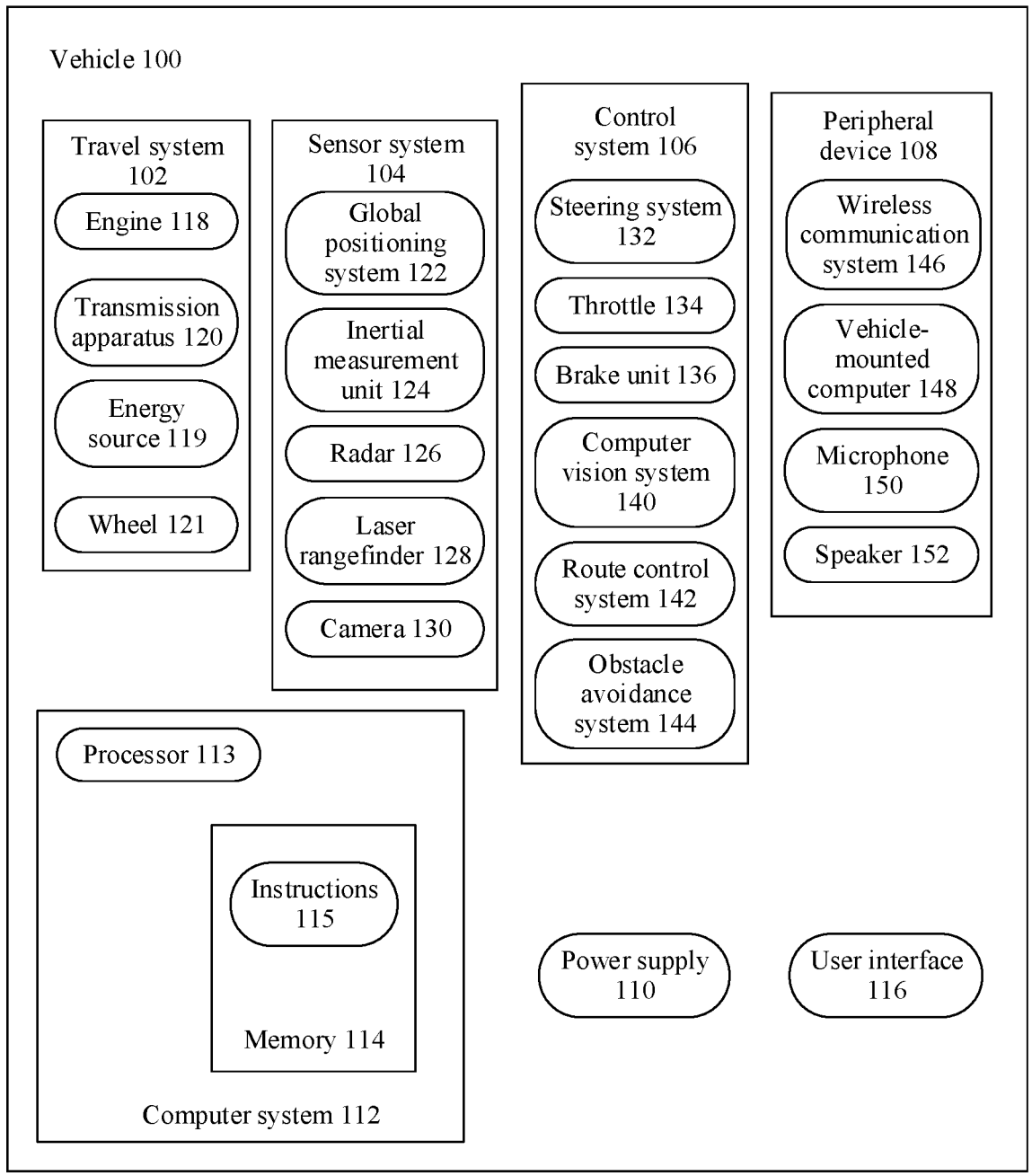
FIG. 2 is a schematic diagram of a structure of an autonomous driving vehicle according to an embodiment of this application.

FIG. 2 is a function block diagram of a vehicle 100 according to an embodiment of this application. In an embodiment, the vehicle 100 is configured to be in a fully or partially autonomous driving mode. For example, the vehicle 100 may control the vehicle 100 when being in an autonomous driving mode, and may determine current states of the vehicle and an ambient environment of the vehicle through a manual operation, determine possible behavior of at least one another vehicle in the ambient environment, determine a confidence level corresponding to a possibility that the another vehicle performs the possible behavior, and control the vehicle 100 based on determined information. When the vehicle 100 is in the autonomous driving mode, the vehicle 100 may be set to operate without interacting with a person.

The vehicle 100 may include various subsystems, for example, a travel system 102, a sensor system 104, a control system 106, one or more peripheral devices 108, a power supply 110, a computer system 112, and a user interface 116. Optionally, the vehicle 100 may include more or fewer subsystems, and each subsystem may include a plurality of components. In addition, each subsystem and component of the vehicle 100 may be interconnected in a wired or wireless manner.

The travel system 102 may include a component that provides power for the vehicle 100 to move. In an embodiment, the propulsion system 102 may include an engine 118, an energy source 119, a transmission apparatus 120, and wheels/tires 121. The engine 118 may be an internal combustion type engine, a motor, an air compression engine, or another type of engine combination, for example, a hybrid engine including a gasoline engine and a motor, or a hybrid engine including an internal combustion type engine and an air compression engine. The engine 118 converts the energy source 119 into mechanical energy.

Examples of the energy source 119 include gasoline, diesel, other oil-based fuels, propane, other compressed gas-based fuels, ethanol, solar panels, batteries, or other power sources. The energy source 119 may also provide energy to another system of the vehicle 100.

The transmission apparatus 120 may transmit mechanical power from the engine 118 to the wheel 121. The transmission apparatus 120 may include a gearbox, a differential, and a drive shaft. In an embodiment, the transmission apparatus 120 may further include another component, for example, a clutch. The drive shaft may include one or more shafts that may be coupled to one or more wheels 121.

The sensor system 104 may include several sensors that can sense information about the ambient environment of the vehicle 100. For example, the sensor system 104 may include a positioning system 122 (the positioning system may be a GPS system, a BeiDou system, or another positioning system), an inertial measurement unit (inertial measurement unit, IMU) 124, a radar 126, a laser rangefinder 128, and a camera 130. The sensor system 104 may further include sensors (for example, an in-vehicle air quality monitor, a fuel gauge, and an oil temperature gauge) in an internal system of the monitored vehicle 100. Sensor data from one or more of these sensors can be used to detect an object and corresponding features (a position, a shape, a direction, a speed, and the like) of the object. Such detection and recognition are key functions of a safe operation of the autonomous driving vehicle 100.

The positioning system 122 may be configured to estimate a geographical location of the vehicle 100. The IMU 124 is configured to sense a location and an orientation change of the vehicle 100 based on inertial acceleration. In an embodiment, the IMU 124 may be a combination of an accelerometer and a gyroscope.

The radar 126 may sense an object in the ambient environment of the vehicle 100 by using a radio signal. In some embodiments, in addition to sensing an object, the radar 126 may further be configured to sense a speed and/or a moving direction of the object.

The laser rangefinder 128 may sense, by using a laser, an object in an environment in which the vehicle 100 is located. In some embodiments, the laser rangefinder 128 may include one or more laser sources, a laser scanner, one or more detectors, and another system component.

The camera 130 may be configured to capture a plurality of images of the ambient environment of the vehicle 100. The camera 130 may be a static camera or a video camera.

The control system 106 controls operations of the vehicle 100 and components of the vehicle 100. The control system 106 may include various elements, including a steering system 132, a throttle 134, a brake unit 136, a computer vision system 140, a route control system 142, and an obstacle avoidance system 144.

The steering system 132 may be operated to adjust a moving direction of the vehicle 100. For example, in an embodiment, the steering system 132 may be a steering wheel system.

The throttle 134 is configured to control an operating speed of the engine 118 and further control a speed of the vehicle 100.

The brake unit 136 is configured to control the vehicle 100 to decelerate. The brake unit 136 may use friction to slow down the wheel 121. In another embodiment, the brake unit 136 may convert kinetic energy of the wheel 121 into a current. The brake unit 136 may alternatively use another form to reduce a rotation speed of the wheel 121, to control the speed of the vehicle 100.

The computer vision system 140 may operate to process and analyze an image captured by the camera 130, to identify an object and/or a feature in the ambient environment of the vehicle 100. The object and/or the feature may include a traffic signal, a road boundary, and an obstacle. The computer vision system 140 may use an object recognition algorithm, a structure from motion (structure from motion, SFM) algorithm, video tracking, and another computer vision technology. In some embodiments, the computer vision system 140 may be configured to draw a map for an environment, track an object, estimate a speed of the object, and the like.

The route control system 142 is configured to determine a travel route of the vehicle 100. In some embodiments, the route control system 142 may determine the travel route for the vehicle 100 based on data from the sensors, the GPS 122, and one or more predetermined maps.

The obstacle avoidance system 144 is configured to identify, evaluate, and avoid or bypass a potential obstacle in the environment of the vehicle 100 in another manner.

Certainly, in an example, the control system 106 may add or include components other than those shown and described. Alternatively, the control system 106 may delete some of the foregoing components.

The vehicle 100 interacts with an external sensor, another vehicle, another computer system, or a user by using the peripheral device 108. The peripheral device 108 may include a wireless communication system 146, a vehicle-mounted computer 148, a microphone 150, and/or a speaker 152.

In some embodiments, the peripheral device 108 provides a means for a user of the vehicle 100 to interact with the user interface 116. For example, the vehicle-mounted computer 148 may provide information for the user of the vehicle 100. The user interface 116 may further operate the vehicle-mounted computer 148 to receive a user input. The vehicle-mounted computer 148 may perform operations through a touchscreen. In another case, the peripheral device 108 may provide a means for the vehicle 100 to communicate with another device located in the vehicle. For example, the microphone 150 may receive audio (for example, a voice command or another audio input) from the user of the vehicle 100. Likewise, the speaker 152 may output audio to the user of the vehicle 100.

The wireless communication system 146 may wirelessly communicate with one or more devices directly or through a communication network. For example, the wireless communication system 146 may use 3G cellular communication such as CDMA, EVD0, or GSM/GPRS, 4G cellular communication such as LTE, or 5G cellular network communication. The wireless communication system 146 may communicate with a wireless local area network (wireless local area network, WLAN) through Wi-Fi. In some embodiments, the wireless communication system 146 may directly communicate with a device by using an infrared link, Bluetooth, or ZigBee. Other wireless protocols, for example, various vehicle communication systems such as the wireless communication system 146, may include one or more dedicated short range communications (dedicated short range communications, DSRC) devices, which may include public and/or private data communication between vehicles and/or roadside stations.

The power supply 110 may provide power to various components of the vehicle 100. In an embodiment, the power supply 110 may be a rechargeable lithium-ion or lead-acid battery. One or more battery packs of such a battery may be configured as the power supply to supply power to the components of the vehicle 100. In some embodiments, the power supply 110 and the energy source 119 may be implemented together, for example, in some pure electric vehicles.

Some or all of functions of the vehicle 100 are controlled by the computer system 112. The computer system 112 may include at least one processor 113. The processor 113 executes instructions 115 stored in a non-transient computer-readable medium such as a data storage apparatus 114. The computer system 112 may alternatively be a plurality of computing devices that control an individual component or a subsystem of the vehicle 100 in a distributed manner.

The processor 113 may be any conventional processor, for example, a commercially available CPU. Alternatively, the processor may be a dedicated device such as an ASIC or another hardware-based processor. Although FIG. 2 functionally illustrates the processor, the memory, and other elements of a computer system 112 in a same block, a person of ordinary skill in the art should understand that the processor, the computer, or the memory may actually include a plurality of processors, computers, or memories that may or may not be stored in a same physical housing. For example, the memory may be a hard disk drive, or another storage medium located in a housing different from that of the computer 110. Therefore, it is understood that a reference to the processor or the computer includes a reference to a set of processors or computers or memories that may or may not operate in parallel. Different from using a single processor to perform the steps described herein, some components such as a steering component and a deceleration component may include respective processors. The processor performs only computation related to a component-specific function.

In various aspects described herein, the processor may be located far away from the vehicle and wirelessly communicate with the vehicle. In another aspect, some processes described herein are performed on a processor disposed inside the vehicle, while others are performed by a remote processor, including performing steps necessary for single manipulation.

In some embodiments, the data storage apparatus 114 may include the instruction 115 (for example, program logic), and the instruction 115 may be executed by the processor 113 to perform various functions of the vehicle 100, including the functions described above. The data storage apparatus 114 may further include additional instructions, including instructions for sending data to, receiving data from, interacting with, and/or controlling one or more of the travel system 102, the sensor system 104, the control system 106, and the peripheral device 108.

In addition to the instructions 115, the data storage apparatus 114 may further store data, such as a road map, route information, a location, a direction, a speed, and other vehicle data of the vehicle, and other information. Such information may be used by the vehicle 100 and the computer system 112 when the vehicle 100 operates in an autonomous mode, a semi-autonomous mode, and/or a manual mode.

In this embodiment of this application, the vehicle 100 or the computer system 112 may obtain data from the data storage apparatus 114, and perform the following method 700 or method 1100.

The user interface 116 is used to provide information for or receive information from the user of the vehicle 100. Optionally, the user interface 116 may include one or more input/output devices in a set of peripheral devices 108, for example, the wireless communication system 146, the vehicle-mounted computer 148, the microphone 150, and the speaker 152.

The computer system 112 may control the functions of the vehicle 100 based on inputs received from the various subsystems (for example, the travel system 102, the sensor system 104, and the control system 106) and from the user interface 116. For example, the computer system 112 may access and use input from the control system 106 to control the steering system 132 to avoid an obstacle detected by the sensor system 104 and the obstacle avoidance system 144. In some embodiments, the computer system 112 may operate to provide control on the vehicle 100 and the subsystems of the vehicle 100 in many aspects.

Optionally, one or more of the foregoing components may be installed separately from or associated with the vehicle 100. For example, the data storage apparatus 114 may exist partially or completely separate from the vehicle 100. The foregoing components may be communicatively coupled together in a wired and/or wireless manner.

Optionally, the foregoing components are merely examples. During actual application, components in the foregoing modules may be added or removed based on an actual requirement. FIG. 1 should not be construed as a limitation on this embodiment of this application.

An autonomous driving vehicle traveling on a road, for example, the vehicle 100, may identify an object in an ambient environment of the autonomous driving vehicle, to determine to adjust a current speed. The object may be another vehicle, a traffic control device, or another type of object. In some examples, each identified object may be considered independently, and based on features of each object, such as a current speed of the object, acceleration of the object, and a spacing between the object and the vehicle, may be used to determine the speed to be adjusted by the autonomous driving vehicle.

Optionally, the autonomous driving vehicle 100 or a computing device (such as the computer system 112, the computer vision system 140, and the data storage apparatus 114 in FIG. 1) associated with the autonomous driving vehicle 100 may predict behavior of the identified object based on the characteristic of the identified object and a state (for example, traffic, rain, or ice on a road) of the ambient environment. Optionally, all identified objects depend on behavior of each other, and therefore all the identified objects may be considered together to predict behavior of a single identified object. The vehicle 100 can adjust the speed of the vehicle 100 based on the predicted behavior of the identified object. In other words, the autonomous driving vehicle can determine, based on the predicted behavior of the object, a specific stable state (for example, acceleration, deceleration, or stop) to which the vehicle needs to be adjusted. In this process, another factor may also be considered to determine the speed of the vehicle 100, for example, a horizontal location of the vehicle 100 on a road on which the vehicle travels, curvature of the road, and proximity between a static object and a dynamic object.

In addition to providing an instruction for adjusting the speed of the autonomous driving vehicle, the computing device may provide an instruction for modifying a steering angle of the vehicle 100, so that the autonomous driving vehicle can follow a given track and/or maintain a safe horizontal distance and a safe vertical distance from an object (for example, a car on a neighboring lane of the road) near the autonomous driving vehicle.

The vehicle 100 may be a car, a truck, a motorcycle, a bus, a boat, an airplane, a helicopter, a lawn mower, a recreational vehicle, a playground vehicle, a construction device, a trolley, a golf cart, a train, a handcart, or the like. This is not specifically limited in this embodiment of this application.

Figure 3:
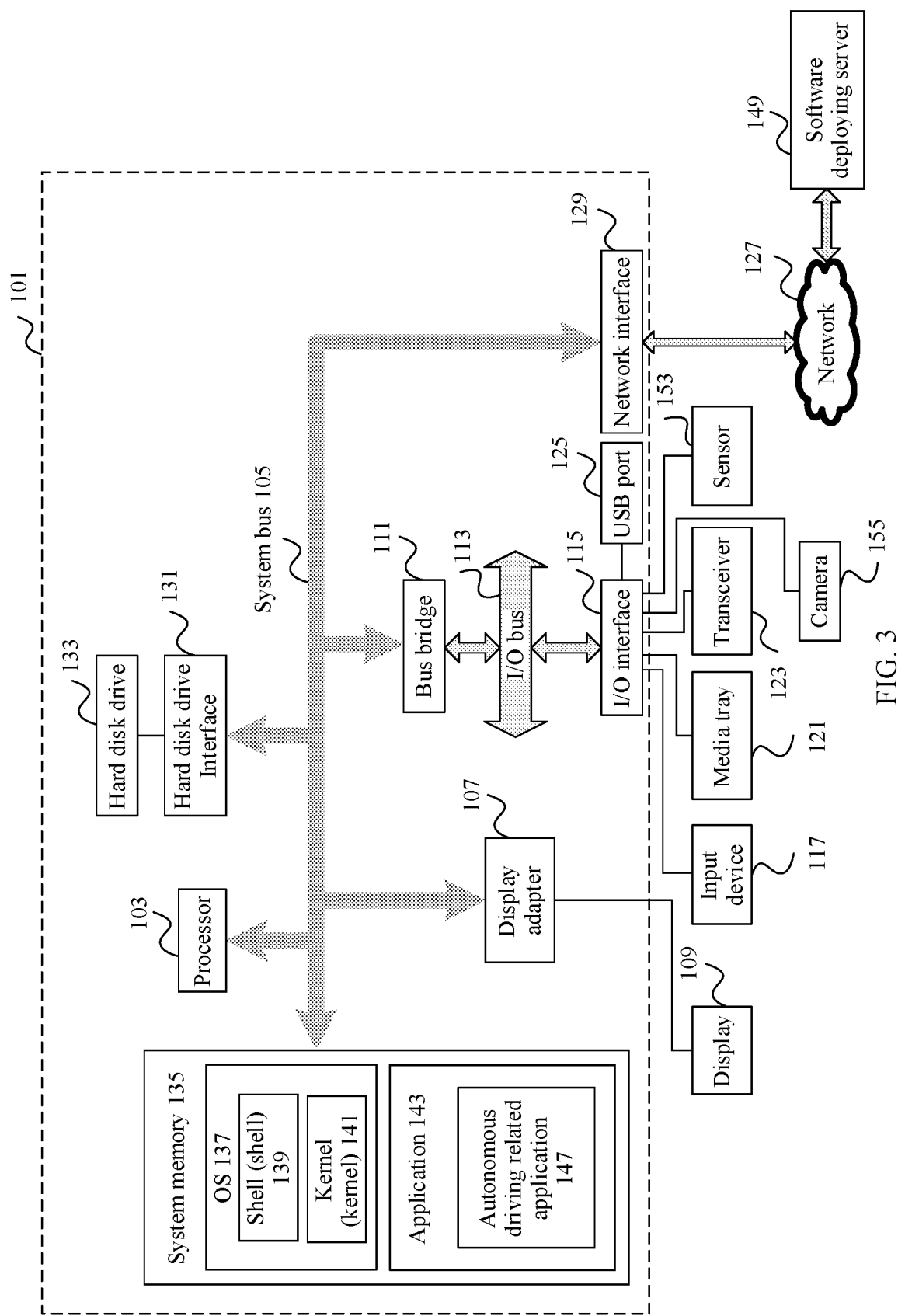
FIG. 3 is a schematic diagram of a structure of a computer system according to an embodiment of this application.

According to FIG. 3, a computer system 101 includes a processor 103. The processor 103 is coupled to a system bus 105. The processor 103 may be one or more processors. Each processor may include one or more processor cores. The computer system 101 further includes a display adapter (video adapter) 107. The display adapter may drive a display 109. The display 109 is coupled to the system bus 105. The system bus 105 is coupled to an input/output (I/O) bus 113 through a bus bridge 111. An I/O interface 115 is coupled to the I/O bus. The I/O interface 115 communicates with a plurality of I/O devices, for example, an input device 117 (for example, a keyboard, a mouse, and a touchscreen) and a media tray (media tray) 121 (for example, a CD-ROM and a multimedia interface). A transceiver 123 (which may send and/or receive a radio communication signal), a camera 155 (which may capture static and dynamic digital video images), and an external USB port 125 are provided. Optionally, an interface connected to the I/O interface 115 may be a USB port.

The processor 103 may be any conventional processor, including a reduced instruction set computing ("RISC") processor, a complex instruction set computing ("CISC") processor, or a combination thereof. Optionally, the processor may be a dedicated apparatus such as an application-specific integrated circuit ("ASIC"). Optionally, the processor 103 may be a neural-network processor or a combination of the neural-network processor and the foregoing conventional processor.

Optionally, in various embodiments described in this specification, the computer system 101 may be located far away from the autonomous driving vehicle, and can wirelessly communicate with the autonomous driving vehicle. In other aspects, some of the processes described in this application are performed on a processor disposed inside the autonomous driving vehicle, and others are performed by a remote processor, including taking actions required to perform a single operation.

The computer 101 may communicate with a software deploying server (deploying server) 149 through a network interface 129. The network interface 129 is a hardware network interface, for example, a network interface card. A network 127 may be an external network, such as the Internet; or may be an internal network, such as the Ethernet or a virtual private network (VPN). Optionally, the network 127 may alternatively be a wireless network, for example, a Wi-Fi network or a cellular network.

A hard disk drive interface is coupled to the system bus 105. A hardware drive interface is connected to the hard disk drive. A system memory 135 is coupled to the system bus 105. Data running in the system memory 135 may include an operating system (OS) 137 and an application 143 of the computer 101.

The operating system includes a shell (shell) 139 and a kernel (kernel) 141. The shell 139 is an interface between a user and the kernel (kernel) of the operating system. The shell is an outermost layer of the operating system. The shell manages interaction between the user and the operating system: waiting for an input from the user, interpreting the input from the user to the operating system, and processing various output results of the operating system.

The kernel 141 includes components of the operating system that are configured to manage a memory, a file, a peripheral, and a system resource. When directly interacting with hardware, the kernel of the operating system usually runs a process, provides inter-process communication, and provides functions such as CPU time slice management, interrupt, memory management, and I/O management.

The application 143 includes an application 147 for controlling autonomous driving of the vehicle, for example, an application for managing interaction between the autonomous driving vehicle and an obstacle on a road, an application for controlling a route or a speed of the autonomous driving vehicle, an application for controlling interaction between the autonomous driving vehicle and another autonomous driving vehicle on a road. The application 143 also exists in a system of the deploying server 149. In one embodiment, when the application 147 needs to be executed, the computer system 101 may download the application 143 from the deploying server 149.

In this embodiment of this application, the application 147 may include an application for controlling a speed of the autonomous driving vehicle. The computer system 101 may invoke the application 147 to perform the following steps:

obtaining a motion status of an obstacle, where the motion status of the obstacle includes a location of the obstacle and a speed of the obstacle;

determining a location of a towing point and a speed of the towing point based on the motion status of the obstacle, where the speed of the towing point indicates an expected speed of an ego vehicle at the location of the towing point, the location of the towing point is a continuous function of the motion status of the obstacle, and the speed of the towing point is a continuous function of the motion status of the obstacle; and obtaining expected acceleration of the ego vehicle based on the location of the towing point and the speed of the towing point.

A sensor 153 is associated with the computer system 101. The sensor 153 is configured to detect an ambient environment of the computer system 101. For example, the sensor 153 can detect animals, vehicles, obstacles, pedestrian crosswalks, and the like. Further, the sensor can detect ambient environments of the animals, the vehicles, the obstacles, or the pedestrian crosswalks. For example, the sensor can detect the ambient environment of animals such as other animals in the ambient environment, a weather condition, and brightness of the ambient environment. Optionally, if the computer system 101 is located on the autonomous driving vehicle, the sensor may be a camera, an infrared sensor, a chemical detector, a microphone, or the like.

Figure 4:
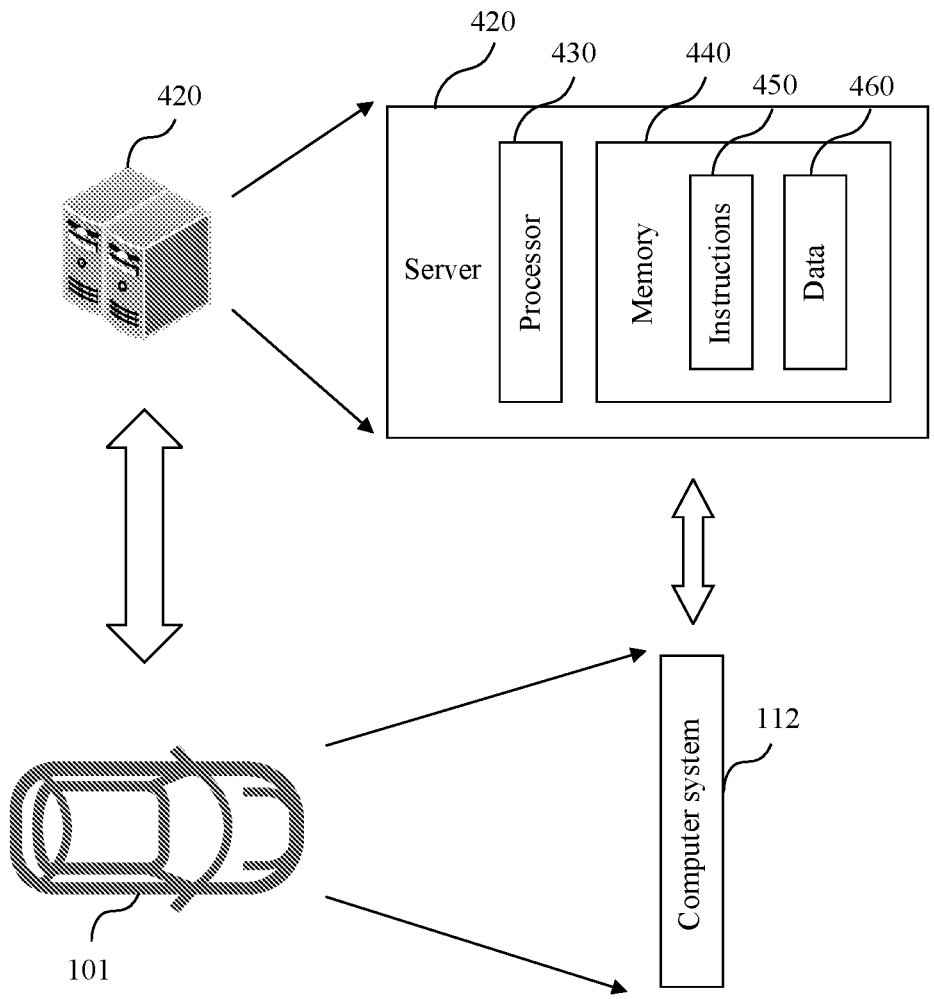
FIG. 4 is a schematic diagram of application of a cloud-side instructed autonomous driving vehicle according to an embodiment of this application.

The computer system 112 may also receive information from or transfer information to other computer systems. Alternatively, the sensor data collected by the sensor system 104 of the vehicle 100 may be transferred to another computer for processing. As shown in FIG. 4, data from the computer system 112 may be transmitted through a network to a cloud-side server 420 for further processing. The network and an intermediate node may include various configurations and protocols, including Internet, World Wide Web, an intranet, a virtual private network, a wide area network, a local area network, a dedicated network using a proprietary communication protocol of one or more companies, Ethernet, Wi-Fi, HTTP, and various combinations thereof. Such communication may be performed by any device that can transmit data to and from other computers, such as a modem or a wireless interface.

In an example, the server 420 may include a server such as a load balancing server cluster having a plurality of computers, and exchanges information with different nodes of the network for the purpose of receiving, processing, and transmitting data from the computer system 112. The server may be configured by the computer system 112. The server has a processor 430, a memory 440, an instruction 450, and data 460.

In an example, the data 460 of the server may include data received from the computer system, for example, data collected by a vehicle sensor. The processor 430 executes the following method 700 by reading the instruction 450.

Figure 5:
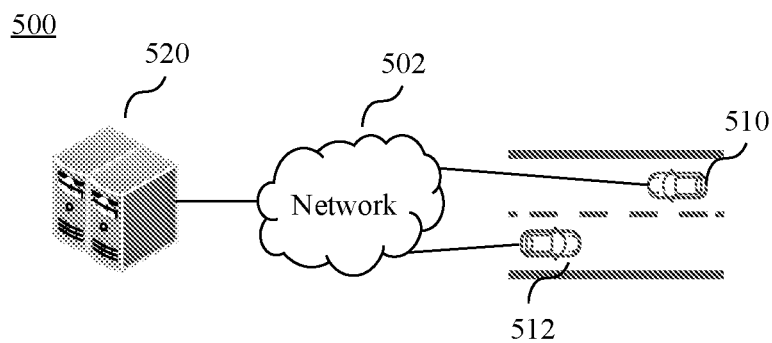
FIG. 5 is a schematic diagram of application of a cloud-side instructed autonomous driving vehicle according to an embodiment of this application.

FIG. 5 illustrates an example of autonomous driving vehicles and cloud service centers according to an example embodiment. The cloud service center may receive information (such as data collected by a vehicle sensor or other information) from autonomous driving vehicles 510 and 512 in an operation environment 500 of the cloud service center through a network 502 such as a wireless communication network.

For example, the data received by the cloud service center may include speed information and location information of the autonomous driving vehicles 510 and 512.

The cloud service center runs, based on the received data, a stored program for controlling autonomous driving of the vehicle, to control the autonomous driving vehicles 510 and 512. The program for controlling autonomous driving of the vehicle may be a program for managing interaction between the autonomous driving vehicle and an obstacle on a road, a program for controlling a route or a speed of the autonomous driving vehicle, or a program for controlling interaction between the autonomous driving vehicle and another autonomous driving vehicle on a road.

The network 502 provides a portion of a map outward to the autonomous driving vehicle 510 or 512. In another example, operations may be divided between different locations or centers. For example, a plurality of cloud service centers may receive, acknowledge, combine, and/or send information reports. In some examples, information reports and/or sensor data may also be sent between the autonomous driving vehicles. Another configuration is also possible.

In some examples, the cloud service center sends, to the autonomous driving vehicle, a recommended solution (for example, informing a front obstacle and how to bypass it) about a possible driving situation in an environment. For example, the cloud service center may assist the vehicle in determining how to travel when there is a specific obstacle ahead in the environment. The cloud service center sends, to the autonomous driving vehicle, a response indicating how the vehicle should travel in a given scenario. For example, the cloud service center may determine, based on collected sensor data, that there is a temporary stop sign in the road ahead, and further determine, based on a "Lane closed" sign and sensor data from a construction vehicle, that the lane is closed due to construction. Correspondingly, the cloud service center sends a suggested operation mode used by the autonomous driving vehicle to pass by the obstacle (for example, indicating the vehicle to change to another road). When the cloud service center observes a video stream in an operating environment of the cloud service center and has determined that the autonomous driving vehicle can safely and successfully pass by the obstacle, operation steps used for the autonomous driving vehicle may be added to a driving information map. Correspondingly, the information may be sent to another vehicle that may encounter a same obstacle in the area, to assist the another vehicle in recognizing the closed lane and also in knowing how to pass by.

To keep safety and comfort during the cruise of the autonomous driving vehicle, an appropriate speed constraint is needed. Through arrangement of an untouchable virtual wall (which may be referred to as an "added wall"), the ego vehicle keeps a safe distance from the virtual wall, so that a reasonable speed constraint is obtained. The virtual wall is an imaginary wall that carries motion parameters such as a distance and a speed. The ego vehicle needs to keep a safe distance and a speed following the wall. Common wall adding scenarios include: For an object already in a lane of the ego vehicle, the virtual wall is set at a location of the object; and for a traffic light or a parking sign, the virtual wall is set at a stop line.

For vehicles in adjacent lanes, the virtual wall has a boundary. For example, when a horizontal distance between another vehicle and the ego vehicle is less than a specified threshold, the virtual wall is usually set at the rear of the another vehicle. When the horizontal distance between the another vehicle and the ego vehicle is greater than or equal to the specified threshold, the virtual wall is usually not set. However, when the ego vehicle detects that a location of the another vehicle changes, a horizontal distance between the ego vehicle and the another vehicle may change, and may change around the specified threshold. In this case, the virtual wall may be unstable and may change between being set and being not set. For example, because of perceived noise, the location of the another vehicle detected by the ego vehicle has an error. If the horizontal distance between the ego vehicle and the another vehicle changes around the specified threshold, the virtual wall is unstable. In addition, for a static obstacle near the ego vehicle, for example, a parking vehicle on a roadside, when a horizontal distance between the ego vehicle and the obstacle is small, due to impact such as perceived noise, the horizontal distance between the obstacle detected by the ego vehicle and the ego vehicle may change around a specified threshold, and consequently the virtual wall is unstable. When the virtual wall is set, a towing point corresponding to the virtual wall exists correspondingly, and is used to tow the ego vehicle to move forward, and provide a speed constraint for the ego vehicle, for example, to keep a specific distance from the virtual wall, the ego vehicle decelerates. When the virtual wall is not set, a towing point that provides a speed constraint for the ego vehicle does not exist correspondingly, and the ego vehicle moves at a constant speed or accelerates. When the virtual wall is unstable, speed jumps occur, and the ego vehicle frequently accelerates and decelerates, affecting user experience.

For an obstacle that has a tendency of intruding into the lane of the ego vehicle but has a low intrusion degree, if a horizontal distance between the ego vehicle and another vehicle is large, the virtual wall is usually not set, and the ego vehicle may appropriately travel, for example, accelerate or drive at a constant speed, or in other words, a speed of the ego vehicle may be greater than a tangential speed of the obstacle, and exceeds the obstacle before the obstacle intrudes into the lane of the ego vehicle. If the virtual wall is set, the another vehicle becomes an object for the ego vehicle to follow, and the ego vehicle always keeps a distance following the another vehicle. Especially when a lateral speed of the another vehicle is low, the ego vehicle needs to be constrained by an unnecessary speed constraint for a long time, affecting appropriate driving of the ego vehicle. Therefore, to ensure appropriate driving of the ego vehicle, when the horizontal distance between the ego vehicle and the another vehicle is large, the virtual wall is usually not set. However, when an obstacle intrusion degree continuously increases and the obstacle intrusion degree is high, for example, the horizontal distance between the obstacle and the ego vehicle is less than a specified threshold, the virtual wall is set. In this case, a tangential distance between the ego vehicle and the obstacle is already too small, the ego vehicle cannot decelerate in a timely manner, and a collision risk may occur. Alternatively, to avoid collision, the ego vehicle suddenly decelerates, or a driver urgently takes over the ego vehicle, seriously affecting user experience. For another example, during overtaking, if a horizontal distance between an overtaken vehicle and the ego vehicle is too small, or the overtaken vehicle performs a dangerous action of lateral vehicle blocking, the ego vehicle usually does not decelerate in an existing solution. To avoid collision, the ego vehicle needs to provide a high horizontal control capability. In other words, the ego vehicle needs to increase the horizontal distance from the overtaken vehicle, affecting user experience.

This application proposes an autonomous driving method and an apparatus, to reduce a sudden change of a vehicle speed and improve user experience.

Figure 6:
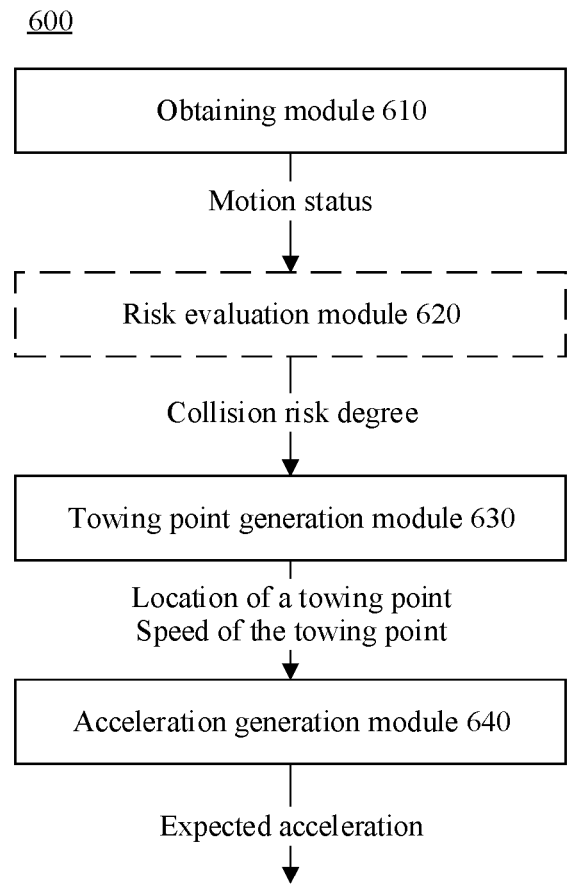
FIG. 6 is a schematic block diagram of an autonomous driving apparatus according to an embodiment of this application.

FIG. 6 is a schematic block diagram of an autonomous driving apparatus 600 according to an embodiment of this application.

To better understand the method in this embodiment of this application, the following briefly describes functions of modules in FIG. 6.

The apparatus 600 includes an obtaining module 610, a risk evaluation module (risk evaluator) 620, a towing point generation module (towing point generator) 630, and an acceleration generation module (acceleration generator) 640.

The obtaining module 610 is configured to obtain a motion status of an obstacle.

For example, the obstacle may include an object such as another vehicle, a bicycle, or a pedestrian.

The motion status of the obstacle may include a location of the obstacle, acceleration of the obstacle, a speed of the obstacle, or the like.

The risk evaluation module 620 is configured to calculate a collision risk degree based on the motion status of the obstacle.

The collision risk degree may alternatively be referred to as a proximity risk degree. The collision risk degree may indicate a degree of proximity between the obstacle and an ego vehicle. Alternatively, it may be understood that the collision risk degree indicates a risk of collision between the obstacle and an ego vehicle. A higher collision risk degree indicates a higher collision risk. For example, when the obstacle is located in an adjacent lane of the ego vehicle, the collision risk degree may be a lateral collision risk degree between the obstacle and the ego vehicle.

For a specific method for calculating the collision risk degree, refer to step S720 in the following method 700.

It should be noted that the risk evaluation module 620 is an optional module. The obtaining module 610 may input the motion status of the obstacle to the towing point generation module 630.

The towing point generation module 630 calculates a speed of a towing point and a location of the towing point.

The speed of the towing point indicates an expected speed of the ego vehicle at the location of the towing point.

The location of the towing point is a continuous function of the motion status of the obstacle. The speed of the towing point is a continuous function of the motion status of the obstacle.

The towing point generation module 630 may calculate the speed of the towing point and the location of the towing point based on the motion status of the obstacle.

Alternatively, when the apparatus 600 includes the risk evaluation module 620, the towing point generation module 630 may calculate the speed of the towing point and the location of the towing point based on the collision risk degree.

For a method for determining the location of the towing point and the speed of the towing point, refer to step S720 in the following method 700.

The acceleration generation module 640 calculates an expected acceleration of the ego vehicle.

Specifically, the expected acceleration is determined based on a location error and a speed error.

For example, the expected acceleration is a linear combination of the location error and the speed error.

The location error is a difference between the location of the towing point and a current location of the ego vehicle. The speed error is a difference between the speed of the towing point and a current speed of the ego vehicle.

For a method for determining acceleration, refer to step S730 in the following method 700.

According to the solution in this embodiment of this application, both the location of the towing point and the speed of the towing point are the continuous functions of the motion status of the obstacle. After the obstacle is detected or the motion status of the obstacle is obtained, a speed constraint can be continuously provided for the vehicle. The location and the speed of the towing point continuously change with the motion status of the obstacle, to avoid a sudden change of the location and the speed of the towing point caused by impact such as perceived noise. Therefore, frequent acceleration or deceleration of the vehicle can be avoided. This improves user experience.

With reference to FIG. 7 to FIG. 14, the following describes in detail an autonomous driving method according to an embodiment of this application.

Figure 7:
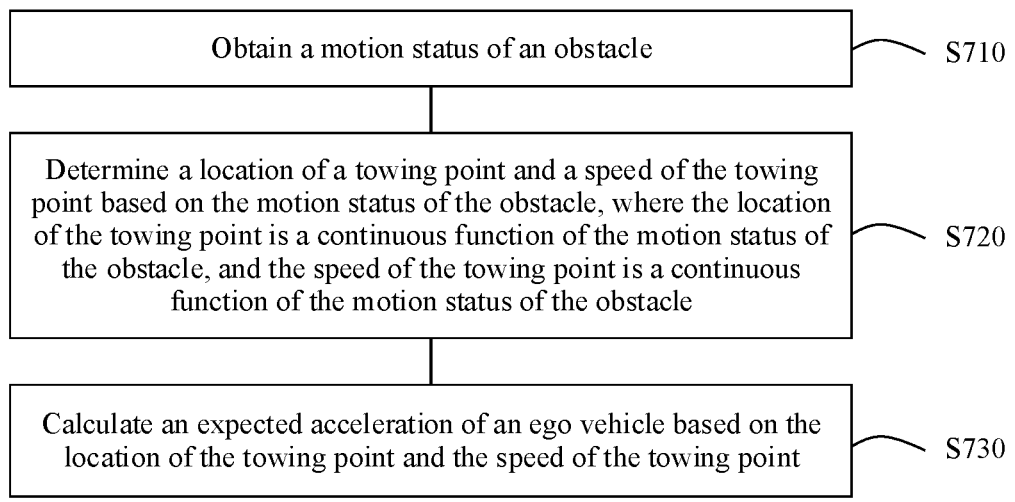
FIG. 7 is a schematic flowchart of an autonomous driving method according to an embodiment of this application.

FIG. 7 shows an autonomous driving method 700 according to an embodiment of this application. The method shown in FIG. 7 may be performed by an autonomous driving apparatus. The autonomous driving apparatus may be a cloud service device, or may be a terminal device, or may be a system including a cloud service device and a terminal device. For example, the method 700 may run on an apparatus, such as an in-vehicle computer, that has a computing capability sufficient to execute the autonomous driving method. A computing capability of the in-vehicle computer can satisfy an update frequency of 30 Hz or higher. For example, the method 700 may be performed by the computer system 112 in FIG. 2, the computer system 101 in FIG. 3, the computer system 112 or the server 420 in FIG. 4, or the cloud service center 520 in FIG. 5, or the method 700 may be performed by the autonomous driving apparatus in FIG. 6.

The method 700 includes step S710 to step S730. The following describes step S710 to step S730 in detail.

S710: Obtain a motion status of an obstacle.

The obstacle is located in a front area of an ego vehicle. The front area of the ego vehicle includes a side front area of the ego vehicle, or may be understood as a side front area outside a target travel route of the ego vehicle.

For example, the obstacle may be a movable object including another vehicle parked on a roadside, another vehicle running in an adjacent lane, or a pedestrian crossing a road. For another example, the obstacle may alternatively include a static object such as a roadblock or a roadside garbage bin.

The motion status of the obstacle may include a location of the obstacle, acceleration of the obstacle, a speed of the obstacle, or the like.

Figure 8:
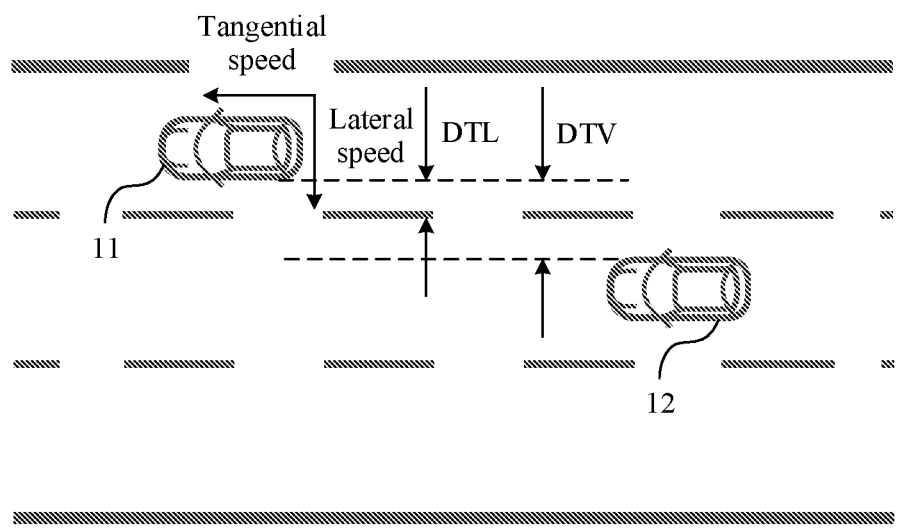
FIG. 8 is a schematic diagram of a collision indicator according to an embodiment of this application.

The speed of the obstacle includes a tangential speed of the obstacle and a lateral speed of the obstacle. As shown in FIG. 8, the lateral speed is a speed in a direction perpendicular to a lane direction. The tangential speed is a speed in a direction parallel to the lane direction.

For example, the motion status of the obstacle may be detected by a perception fusion module. For example, the perception fusion module may include the radar 126, the laser rangefinder 128, or the camera 130 in FIG. 2. For another example, the perception fusion module may include the sensor 153 in FIG. 3.

Further, step S710 may further include: obtaining the target travel route of the ego vehicle.

For example, the target travel route of the ego vehicle may be determined by a motion planning module. For example, the motion planning module may include the route control system 142 in FIG. 2.

The motion planning module may determine the target travel route of the ego vehicle based on parameters such as a road network topology, a location of the ego vehicle, and a speed of the ego vehicle.

For example, the speed of the ego vehicle may be detected by a speed sensor. The location of the ego vehicle may be determined by a positioning system, for example, may be determined by the positioning system 122 in the vehicle 100 in FIG. 2. The road network topology may be determined by a navigation module. The navigation module may also be referred to as a map module, and is configured to provide support, namely, the road network topology, for the route control system 142 in FIG. 2.

When the target travel route of the ego vehicle is obtained, the obstacle may be an obstacle in a front area of the target travel route, and the front area of the target travel route includes a side front area of the target travel route.

S720: Determine a location of a towing point and a speed of the towing point based on the motion status of the obstacle.

The location of the towing point is a continuous function of the motion status of the obstacle. The speed of the towing point is a continuous function of the motion status of the obstacle.

The speed of the towing point indicates an expected speed of the ego vehicle at the location of the towing point.

For example, the location of the towing point is a location A, and the speed of the towing point is a speed B. An expected speed of the ego vehicle at the location A is the speed B. Alternatively, it may be understood that the ego vehicle is expected to arrive at the location A at the speed B.

That the location of the towing point is a continuous function of the motion status of the obstacle means that the location of the towing point continuously changes with the motion status of the obstacle. Because the motion status of the obstacle continuously changes with time, the location of the towing point also continuously changes with time. In other words, the location of the towing point does not change.

That the location of the towing point changes means that the towing point changes from existence to absence, or the towing point changes from absence to existence. In other words, after the obstacle is detected, the location of the towing point continuously changes with the motion status of the obstacle, and the location of the towing point does not change between existence and absence. Alternatively, "continuous" in this embodiment of this application may be understood as that the location of the towing point is not limited to the following two states: The towing point does not exist, and the towing point is at a fixed location. The location of the towing point changes with the motion status of the obstacle. A value of the location of the towing point may include a plurality of values. That the towing point is at a fixed location means that a location at which the towing point keeps a fixed distance from a virtual wall.

That the speed of the towing point is a continuous function of the motion status of the obstacle means that the speed of the towing point continuously changes with the motion status of the obstacle. Because the motion status of the obstacle continuously changes with time, the speed of the towing point also continuously changes with time. In other words, the speed of the towing point does not change.

That the speed of the towing point changes means that the towing point changes from existence to absence, or the towing point changes from absence to existence. In other words, after the obstacle is detected, the speed of the towing point continuously changes with the motion status of the obstacle, and the speed of the towing point does not change between existence and absence. Alternatively, "continuous" in this embodiment of this application may be understood as that the speed of the towing point is not limited to the following two states: The speed in the absence of the towing point, and the speed of the towing point is a fixed speed. The speed of the towing point changes with the motion status of the obstacle. A value of the speed of the towing point may include a plurality of speed values. It should be noted that, when the speed of the towing point is a fixed speed, the fixed speed is not a constant value, but is a fixed speed relative to a reference system. For example, that the speed of the towing point is a fixed speed means that the speed of the towing point is the speed of the obstacle.

The towing point is used to provide a speed constraint for the ego vehicle. The towing point can provide the speed constraint for the ego vehicle. There is no towing point for providing the speed constraint for the ego vehicle. In this embodiment of this application, after the obstacle is detected, the speed constraint can be always provided for the ego vehicle, and no change occurs between providing the speed constraint and not providing the speed constraint.

Because the motion status of the obstacle continuously changes with time, the location of the towing point and the speed of the towing point that are used as the continuous functions of the motion status of the obstacle also continuously change with time. This avoids frequent acceleration or deceleration of the ego vehicle caused by a sudden change of the location and the speed of the towing point.

Optionally, the method 700 further includes: generating a virtual wall based on the motion status of the obstacle.

Figure 9:
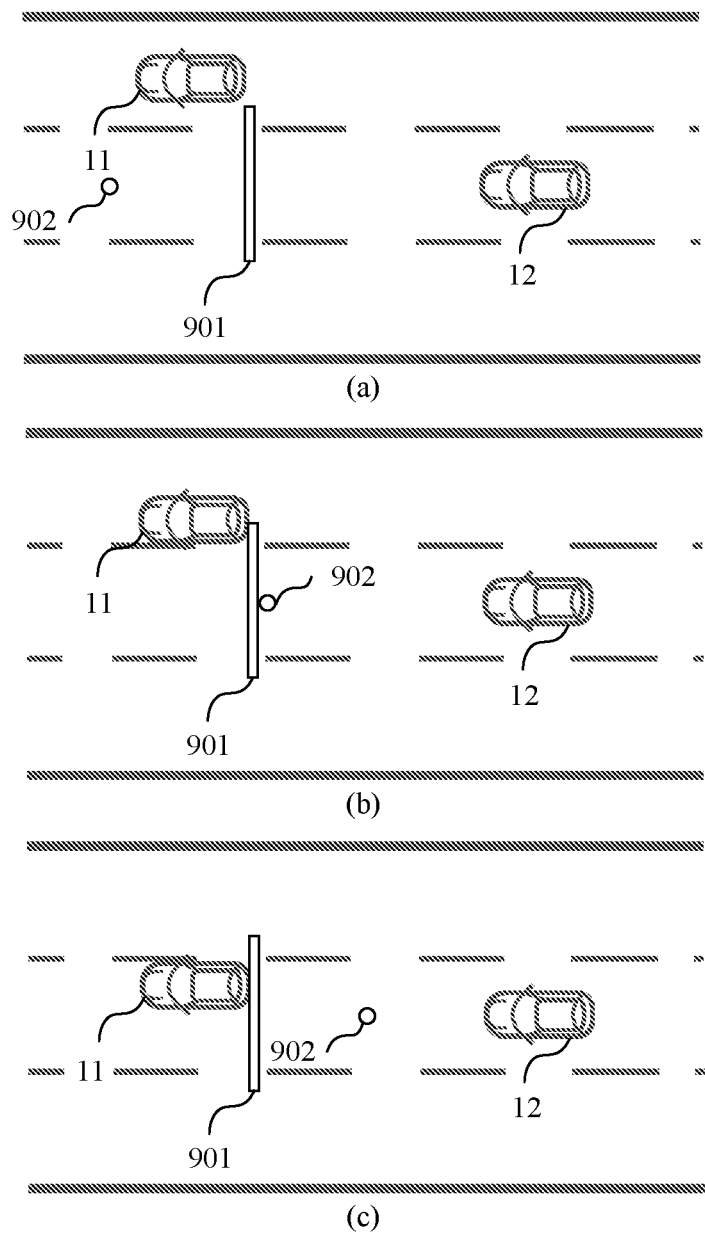
FIG. 9 is a schematic diagram of a location of a towing point according to an embodiment of this application.

For example, the virtual wall is generated based on the location of the obstacle. For example, the virtual wall may be located behind the obstacle and adjacent to the obstacle, and is perpendicular to the lane direction. As shown in FIG. 9, the obstacle is another vehicle 11. A virtual wall 901 may be located at a tail of the another vehicle 11, and is perpendicular to a lane direction.

Figure 13:
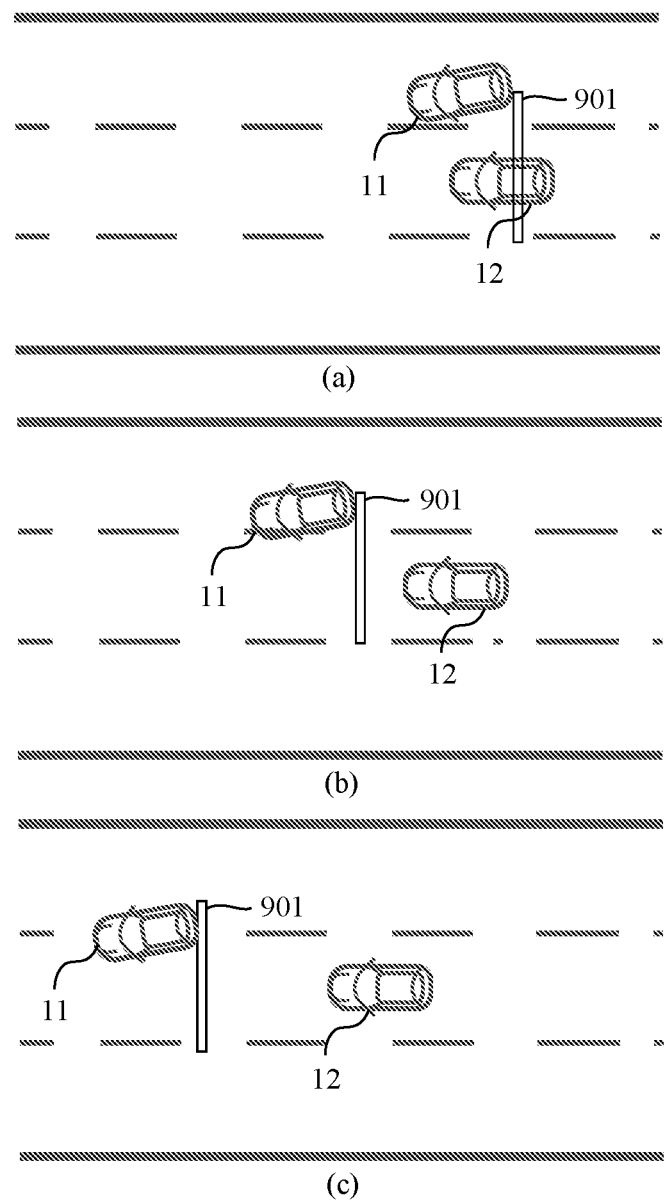
FIG. 13 is a schematic diagram of driving a vehicle in a solution according to an embodiment of this application in a case of lateral vehicle blocking.
Figure 14:
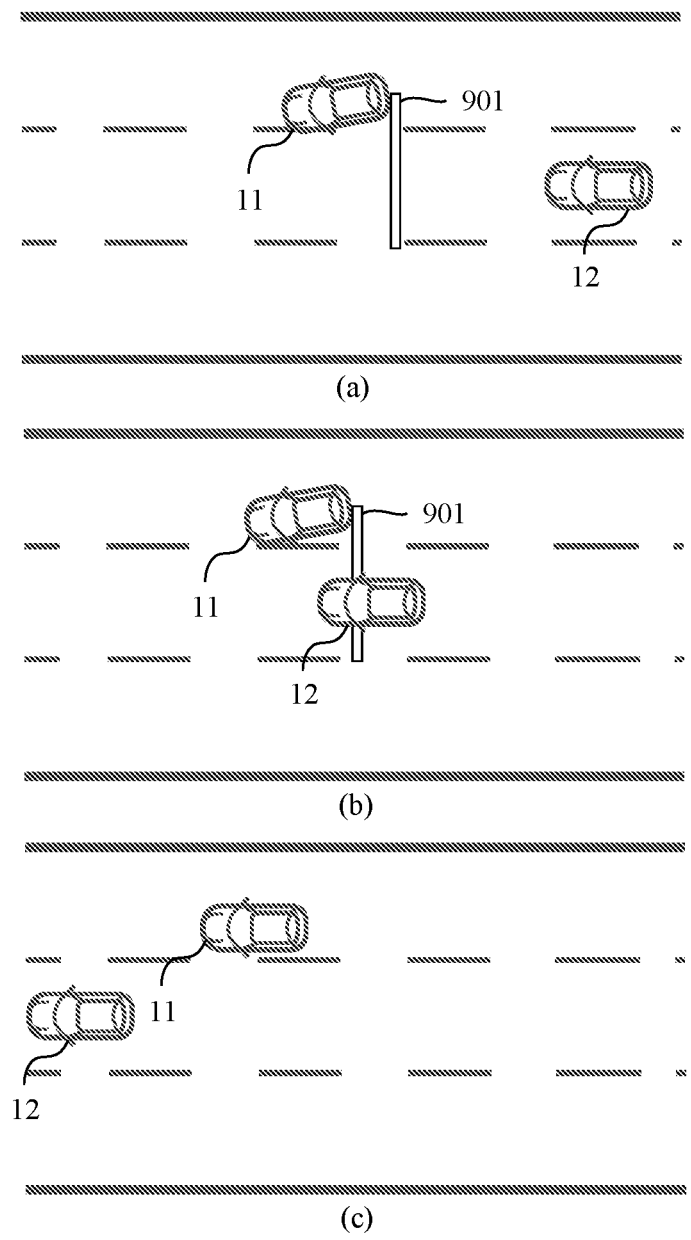
FIG. 14 is a schematic diagram of driving a vehicle when a location of another vehicle changes according to an embodiment of this application.

A status of the virtual wall includes a penetrable state and an impenetrable state. The penetrable state means that the ego vehicle may penetrate through the virtual wall in a running process. For example, as shown in FIG. 14, the virtual wall is a penetrable virtual wall, and the ego vehicle may penetrate through the virtual wall. The impenetrable state means that the ego vehicle cannot penetrate through the virtual wall in a running process, or that the ego vehicle needs to keep a specific safe distance from the virtual wall. For example, as shown in FIG. 13, the virtual wall is an impenetrable virtual wall, and the ego vehicle cannot penetrate through the virtual wall.

For example, the status of the virtual wall is related to the location of the towing point.

For example, when the status of the virtual wall is the penetrable state, the location of the towing point may be located at the virtual wall or in front of the virtual wall. When the status of the virtual wall is the impenetrable state, the location of the towing point is located at the rear of the virtual wall.

It should be understood that the foregoing is merely an example. In an implementation process of the solution, a relationship between the status of the virtual wall and the location of the towing point may alternatively include another representation form. For example, when the status of the virtual wall is the penetrable state, the location of the towing point may alternatively be located at the rear of the virtual wall. It should be noted that descriptions such as "front" and "rear" in this embodiment of this application are all relative to a vehicle moving direction. For example, in FIG. 9, an ego vehicle 12 moves forward, namely, to the left side of the figure. In (a) in FIG. 9, a towing point 902 is located on the left side of the virtual wall 901. In other words, the towing point 902 is located in front of the virtual wall 901.

As shown in FIG. 9, in (a) in FIG. 9, the towing point 902 is located in front of the virtual wall 901, and the virtual wall 901 is in the penetrable state. In (b) in FIG. 9, the towing point 902 is located at the virtual wall 901, and the virtual wall 901 is in the penetrable state. In (c) in FIG. 9, the towing point 902 is located at the rear of the virtual wall 901, and the virtual wall 901 is in the impenetrable state. It should be understood that FIG. 9 is merely an example. When the towing point is located at the rear of the virtual wall, the virtual wall may alternatively be in the penetrable state.

For example, the location of the towing point may be represented by a following distance. The following distance is a distance between the virtual wall and the towing point. For example, the following distance may be a positive number, zero, or a negative number. When the following distance is a positive number, the virtual wall is located at the rear of the towing point, and the status of the virtual wall is the impenetrable state or the penetrable state. When the following distance is 0, the towing point is located at the virtual wall, and the status of the virtual wall is the penetrable state. When the following distance is a negative number, the virtual wall is located in front of the towing point, and the status of the virtual wall is the penetrable state. For another example, the following distance may be a positive number, zero, or a negative number. When the following distance is a positive number, the virtual wall is located in front of the towing point, and the status of the virtual wall is the penetrable state. When the following distance is 0, the towing point is located at the virtual wall, and the status of the virtual wall is the penetrable state. When the following distance is a negative number, the virtual wall is located at the rear of the towing point, and the status of the virtual wall is the impenetrable state or the penetrable state.

It should be understood that the foregoing is merely an example. The location of the towing point may alternatively be represented in another manner. For example, the location of the towing point is represented by using a tangential distance between the towing point and the obstacle. This is not limited in this application. The tangential distance refers to a distance in a direction parallel to the lane direction.

Optionally, the speed of the towing point is determined based on a tangential speed of the obstacle and a penetration speed of the ego vehicle.

For example, the speed of the towing point is a sum of the tangential speed of the obstacle and the penetration speed of the ego vehicle. The speed $V_{towing\ point}$ of the towing point satisfies the following equation:

$$V_{towing\ point} = V_{tangential} + V_{penetration}$$

$V_{tangential}$ represents the tangential speed of the obstacle, and $V_{penetration}$ represents the penetration speed of the ego vehicle.

The penetration speed of the ego vehicle is determined based on the motion status of the obstacle.

Optionally, the status of the virtual wall is related to the speed of the towing point.

For example, when the speed of the towing point is less than or equal to the tangential speed of the obstacle, the status of the virtual wall is the impenetrable state. When the speed of the towing point is greater than the tangential speed of the obstacle, the status of the virtual wall is the penetrable state.

For example, the speed of the towing point is the sum of the tangential speed of the obstacle and the penetration speed of the ego vehicle. The penetration speed of the ego vehicle may be a positive number or zero. In other words, the penetration speed of the ego vehicle is a nonnegative number. In this case, if the penetration speed of the ego vehicle is 0, the speed of the towing point is equal to the tangential speed of the obstacle, and the status of the virtual wall is the impenetrable state. Alternatively, it may be understood that when the status of the virtual wall is the impenetrable state, the speed of the towing point may be determined based on only the tangential speed of the obstacle.

Figure 10:
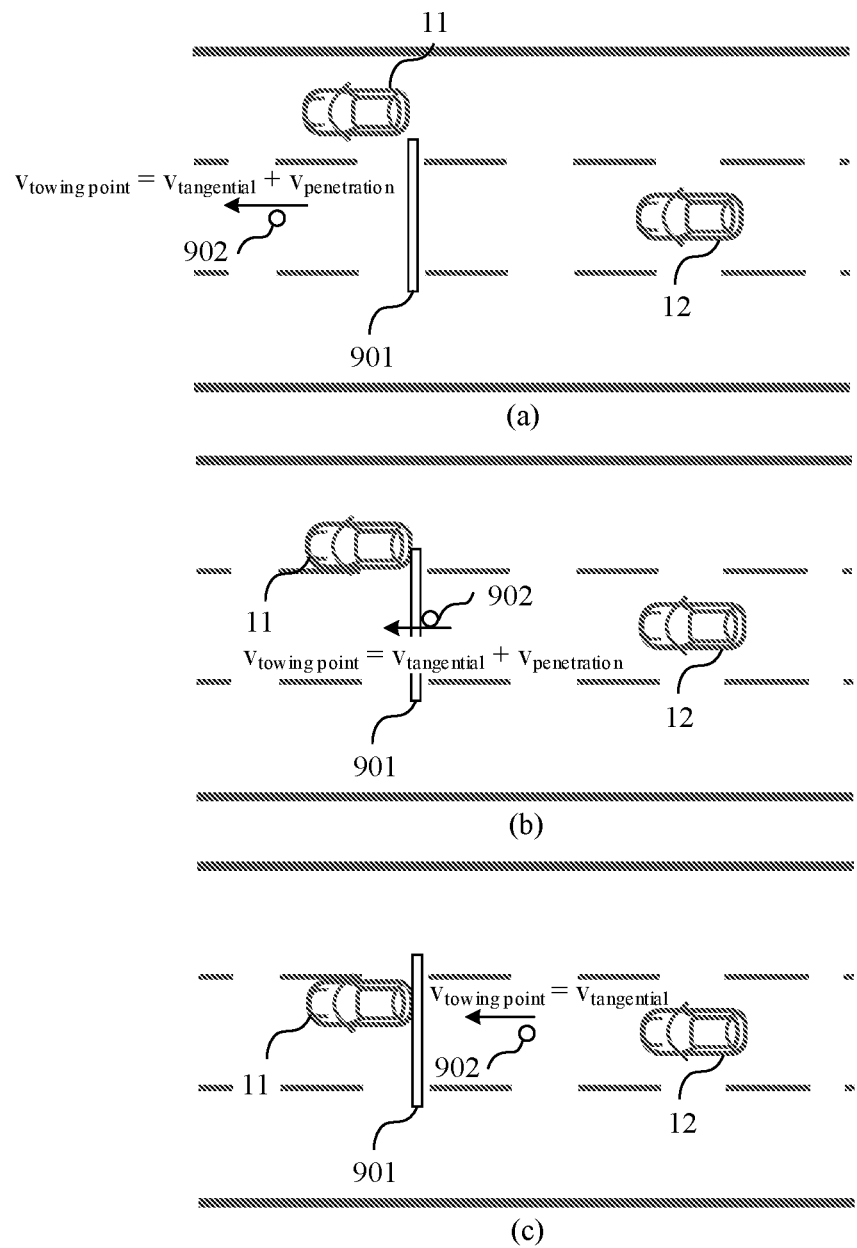
FIG. 10 is a schematic diagram of a speed of a towing point according to an embodiment of this application.

As shown in FIG. 10, in (a) in FIG. 10, the speed $V_{towing\ point}$ of the towing point 902 is the sum of the tangential speed $V_{tangential}$ of the obstacle and the penetration speed $V_{penetration}$ of the ego vehicle, and the virtual wall 901 is in the penetrable state. In (b) in FIG. 10, the speed $V_{towing\ point}$ of the towing point 902 is the sum of the tangential speed V tangential of the obstacle and the penetration speed $V_{penetration}$ of the ego vehicle, and the virtual wall 901 is in the penetrable state. In (c) in FIG. 10, the speed $V_{towing\ point}$ of the towing point is the tangential speed $V_{tangential}$ of the obstacle, and the virtual wall 901 is in the impenetrable state.

For another example, the speed of the towing point is the sum of the tangential speed of the obstacle and the penetration speed of the ego vehicle. The penetration speed of the ego vehicle may be a positive number, zero, or a negative number. In this case, if the penetration speed of the ego vehicle is 0 or a negative number, the speed of the towing point is equal to or less than the tangential speed of the obstacle, and the status of the virtual wall is the impenetrable state.

The towing point corresponds to the virtual wall. In other words, when the virtual wall is set, the towing point provides the speed constraint for the ego vehicle. When the virtual wall is not set, correspondingly there is no towing point for providing the speed constraint for the ego vehicle. The virtual wall continuously exists. The location of the towing point and the speed of the towing point are the continuous functions of the motion status of the obstacle. Therefore, the speed constraint continuously exists, and acceleration of the ego vehicle does not jump. In other words, although the status of the virtual wall changes, because the virtual wall continuously exists, or because the location of the towing point and the speed of the towing point continuously change, the acceleration of the ego vehicle does not jump with the change of the status of the virtual wall.

Optionally, step S720 includes: calculating a collision risk degree based on the motion status of the obstacle; and determining a location of a towing point and a speed of the towing point based on the collision risk degree.

The collision risk degree may alternatively be referred to as a proximity risk degree. The collision risk degree may indicate a degree of proximity between the obstacle and the ego vehicle. Alternatively, it may be understood that the collision risk degree indicates a risk of collision between the obstacle and the ego vehicle. A higher collision risk degree indicates a higher collision risk. For example, when the obstacle is located in an adjacent lane of the ego vehicle, the collision risk degree may be a lateral collision risk degree between the obstacle and the ego vehicle.

Optionally, the calculating a collision risk degree based on the motion status of the obstacle includes: calculating a collision indicator based on the motion status of the obstacle, and calculating the collision risk degree based on the collision indicator.

The following describes the collision indicator by using an example in which the obstacle is located in the adjacent lane of the ego vehicle.

For example, the collision indicator includes any one or more of the following: distance to lane (distance to lane, DTL), time to lane (time to lane, TTL), and distance to vehicle (distance to vehicle, DTV).

In other words, the collision risk degree may be calculated based on any one or more of the foregoing indicators. For example, the collision risk degree is calculated based on DTL. For another example, the collision risk degree is calculated based on TTL and DTV. For another example, the collision risk degree is calculated based on DTL, TTL, and DTV.

A lane in DTL is a lane line between the obstacle and the ego vehicle. The time to lane is estimated time at which the obstacle arrives at the lane line.

Optionally, the lane line may be determined based on the target travel route of the ego vehicle. In other words, the collision indicator is determined based on the motion status of the obstacle and the target travel route of the ego vehicle, and the collision risk degree is calculated based on the collision indicator. Alternatively, it may be understood that the location of the towing point and the speed of the towing point are determined based on the motion status of the obstacle and the target travel route of the ego vehicle.

Further, it may be determined, based on the target travel route, that the ego vehicle changes the lane. Correspondingly, the lane line in the foregoing indicator also changes.

The lateral distance is a distance in a direction perpendicular to the lane direction, and may also be referred to as a horizontal distance. Correspondingly, the tangential distance is a distance in a direction parallel to the lane direction, and may also be referred to as a longitudinal distance.

DTL represents semantic information on traffic rules.

TTL is a quotient of DTL and the lateral speed of the obstacle, and is the estimated time to at which the obstacle arrives at the lane line. TTL represents a moving tendency of the obstacle. The obstacle has a moving tendency of moving toward the lane of the ego vehicle. In other words, the obstacle has an intrusion tendency.

DTV represents a collision risk in kinematics.

For example, as shown in FIG. 8, the obstacle is another vehicle, and DTL and DTV are shown in FIG. 8.

The collision risk degree has a negative correlation with DTL, TTL, and DTV. In other words, higher DTL, TTL, and DTV indicates a lower collision risk degree and a lower possibility of collision.

For example, the collision risk degree (risk) satisfies the following equation:

$$risk=0.3*(2.0-DTL)+0.3*(1.0-TTL)+0.4*(2.5-DTV)$$

In the foregoing equation, the collision risk degree is a monotonically decreasing function of DTL, TTL, and DTV.

It should be noted that the foregoing equation is merely an example. The proximity collision risk degree may alternatively be calculated according to another equation, provided that the collision risk degree is a continuous function of DTL, TTL, and DTV, and has a negative correlation with DTL, TTL, and DTV.

It should be understood that the foregoing is merely an example. The collision risk degree may alternatively be calculated in another manner. For example, the collision risk degree is calculated based on only DTV and TTL. For another example, the collision risk degree may alternatively be calculated based on a parameter other than the foregoing three parameters.

Optionally, the status of the virtual wall may be determined based on the collision risk degree.

For example, when the collision risk degree is greater than or equal to a first threshold, the status of the virtual wall is the impenetrable state. When the collision risk degree is less than the first threshold, the status of the virtual wall is the penetrable state. A value range of the first threshold is (0, 1].

The collision risk degree may be a continuous function of the motion status of the obstacle. Both the location of the towing point and the speed of the towing point are continuous functions of the collision risk degree. Therefore, both the location of the towing point and the speed of the towing point are continuous functions of the motion status of the obstacle.

For example, when the collision risk degree is less than a second threshold, the location of the towing point is located in front of the virtual wall. When the collision risk degree is equal to the second threshold, the location of the towing point is located at the virtual wall. When the collision risk degree is greater than the second threshold, the location of the towing point is located at the rear of the virtual wall. A value range of the second threshold is (0, 1]. The second threshold is less than the first threshold.

The location of the towing point may be represented by a following distance. The following distance is a continuous function of the collision risk degree. As described above, in some implementations, if the following distance is a positive number, it indicates that the location of the towing point is located at the rear of the virtual wall; if the following distance is zero, it indicates that the towing point is located at the virtual wall; or if the following distance is a negative number, it indicates that the location of the towing point is located in front of the virtual wall. In this case, the following distance has a positive correlation with the collision risk degree. In other words, a higher collision risk degree indicates a larger following distance. If the towing point is located at the rear of the virtual wall, the distance between the towing point and the virtual wall is larger. If the towing point is located in front of the virtual wall, the distance between the towing point and the virtual wall is smaller.

For example, the following distance and the collision risk degree (risk) may be determined in Manner 1.

$$\text{Following distance}=\text{ego vehicle speed}*(2.4*risk-1.2)$$

In Manner 1, the following distance is a monotonically increasing function of the collision risk degree. The second threshold is 0.5. When the collision risk degree is less than 0.5, the following distance is a positive number, and the towing point is located in front of the virtual wall. When the collision risk degree is greater than 0.5, the following distance is a negative number, and the towing point is located at the rear of the virtual wall. When the collision risk degree is equal to 0.5, the following distance is 0, and the towing point is located at the virtual wall.

For another example, the following distance and the collision risk degree (risk) may be determined in Manner 2.

When the collision risk degree (risk) is greater than or equal to the first threshold, the following distance and the collision risk degree (risk) may satisfy the following equation:

Following distance=ego vehicle speed*(2.4*risk−1.2)

When the collision risk degree (risk) is less than the first threshold, the following distance and the collision risk degree (risk) may satisfy the following equation:

Following distance=min(ego vehicle speed*(2.4*risk−1.2),d)

d represents the distance between the ego vehicle and the virtual wall.

In Manner 2, if the collision risk degree is less than 1, the following distance is a piecewise function. The piecewise function may be understood as follows: Before the ego vehicle arrives at the location indicated by the former term in the foregoing equation, namely, when the former term in the foregoing equation is less than the latter term in the foregoing equation, the following distance is the monotonically increasing function of the risk degree. After the ego vehicle arrives at the location indicated by the former term, namely, when the former term in the foregoing equation is greater than the latter term, the following distance is the distance between the ego vehicle and the virtual wall. Continuity is maintained in the entire process, and the virtual wall is in the penetrable state. When the collision risk degree is greater than or equal to 1, the following distance is the monotonically increasing function of the risk degree, and the virtual wall is in the impenetrable state.

Before the ego vehicle arrives at the location indicated by the former term in the foregoing equation, it may be understood that the location of the towing point obtained through calculation of the former term is in front of the ego vehicle. In this case, the location of the towing point is determined based on a value of the former term. After the ego vehicle arrives at the location indicated by the former term in the foregoing equation, it may be understood that the location of the towing point obtained through calculation of the former term is at the rear of the ego vehicle. In this case, the location of the towing point keeps consistent with the location of the ego vehicle.

It should be understood that the foregoing equation is merely an example. In an implementation, when the status of the virtual wall is the impenetrable state, a manner of calculating a location of a towing point in an existing solution may be reused.

For example, when the collision risk degree is greater than or equal to 1, the status of the virtual wall is the impenetrable state, and the following distance and the collision risk degree (risk) may satisfy the following equation:

Following distance=ego vehicle speed*1.2

In other words, when the collision risk degree is greater than or equal to 1, the following distance keeps unchanged by using the ego vehicle speed as a reference. For example, when the ego vehicle moves forward at a constant speed, the following distance keeps unchanged.

In this way, an existing mature algorithm can be reused without making a large quantity of drive tests for re-debugging. This reduces debugging costs.

FIG. 9 shows a location of a towing point in a case of different collision risk degrees. The lowest collision risk degree is shown in (a) in FIG. 9, and the highest collision risk degree is shown in (c). When the collision risk degree is low, the towing point is far away from the ego vehicle. As shown in (a) in FIG. 9, the towing point is located in front of the virtual wall, and the distance between the towing point and the ego vehicle is the largest. As the risk degree increases, the distance between the towing point and the ego vehicle decreases. As shown in (b) in FIG. 9, the towing point is located at the rear of the virtual wall. Compared with (a) in FIG. 9, the distance between the towing point and the ego vehicle decreases. As shown in (c) in FIG. 9, the towing point is located at the rear of the virtual wall, the collision risk degree in (c) in FIG. 9 is the highest, and the distance between the towing point and the ego vehicle is the smallest. In this case, if the collision risk degree is greater than or equal to the first threshold, the status of the virtual wall is the impenetrable state. In other words, the virtual wall is equivalent to an impenetrable virtual wall. If the collision risk degree is less than the first threshold, the status of the virtual wall is the penetrable state.

Further, the penetration speed of the ego vehicle is a continuous function of the collision risk degree.

Optionally, the penetration speed of the ego vehicle has a negative correlation with the collision risk degree. In other words, a higher risk degree indicates a lower penetration speed of the ego vehicle.

Optionally, when the collision risk degree is greater than or equal to the first threshold, the speed of the towing point is less than or equal to the tangential speed of the obstacle, and the status of the virtual wall is the impenetrable state.

When the collision risk degree is less than the first threshold, the speed of the towing point is greater than the tangential speed of the obstacle, and the status of the virtual wall is the penetrable state.

For example, the penetration speed of the ego vehicle may satisfy the following equation:

$V_{penetration}=a*(1-risk)$

In the foregoing equation for calculating the penetration speed of the ego vehicle, the penetration speed of the ego vehicle is a nonnegative monotonically decreasing function of the collision risk degree. a is a parameter. A value range of a is [0, 300]. For example, the first threshold is 1, and a is 25. When the collision risk degree is 0, the penetration speed of the ego vehicle is 25 m/s. When the collision risk degree is less than 1, the penetration speed of the ego vehicle is greater than 0, the speed of the towing point is greater than the tangential speed of the obstacle, and the status of the virtual wall is the penetrable state. When the collision risk degree is equal to 1, the penetration speed of the ego vehicle is 0, and the speed of the towing point is equal to the tangential speed of the obstacle. In this case, the status of the virtual wall is the impenetrable state. When the collision risk degree is greater than 1, the penetration speed of the ego vehicle is less than 0, and the speed of the towing point is less than the tangential speed of the obstacle. In this case, the status of the virtual wall is the impenetrable state.

For example, the penetration speed of the ego vehicle may satisfy the following equation:

$V_{penetration}=\max(a*(1-risk),0)$

In the foregoing equation for calculating the penetration speed of the ego vehicle, the penetration speed of the ego vehicle is a nonnegative monotonically decreasing function of the collision risk degree, and the penetration speed of the ego vehicle is a nonnegative number. a is a parameter. A value range of a is [0, 300]. For example, the first threshold is 1, and a is 25. When the collision risk degree is 0, the penetration speed of the ego vehicle is 25 m/s. When the collision risk degree is less than 1, the penetration speed of the ego vehicle is greater than 0, the speed of the towing point is greater than the tangential speed of the obstacle, and the status of the virtual wall is the penetrable state. When the collision risk degree is greater than or equal to 1, the penetration speed of the ego vehicle is 0, and the speed of the towing point is equal to the tangential speed of the obstacle. In this case, the status of the virtual wall is the impenetrable state.

FIG. 10 shows a speed of a towing point in a case of different risk degrees. The lowest risk degree is shown in (a) in FIG. 10, and the highest risk degree is shown in (c). When the risk degree is low, the penetration speed of the ego vehicle is high. As the risk degree increases, the penetration speed of the ego vehicle decreases. When the risk degree is greater than or equal to the second threshold, the penetration speed of the ego vehicle is 0. As shown in FIG. 10, the speed of the towing point is a sum of the penetration speed of the ego vehicle and the tangential speed of the obstacle. In (a) in FIG. 10, the risk degree is the lowest, and the penetration speed of the ego vehicle is the highest. A risk degree in (b) in FIG. 10 is higher than a risk degree in (a) in FIG. 10. A penetration speed of the ego vehicle in (b) in FIG. 10 is lower than a penetration speed of the ego vehicle in (a) in FIG. 10. A risk degree in (c) in FIG. 10 is the highest. The risk degree is greater than the first threshold. The penetration speed of the ego vehicle is 0. The speed of the towing point is the tangential speed of the obstacle.

The collision risk degree may indicate an intrusion degree of the obstacle, namely, a degree of intrusion into the target travel route of the ego vehicle.

In this embodiment of this application, when the intrusion degree of the obstacle is low, the collision risk degree is low, the virtual wall is in the penetrable state, and the ego vehicle can perform preventive deceleration. When the intrusion degree of the obstacle is high, the collision risk degree is high, the virtual wall is in the impenetrable state, and the ego vehicle can keep a safe distance. This avoids collision.

At different intrusion degrees, the status of the virtual wall, the location of the towing point, and the speed of the towing point are different. In a scenario of gradual intrusion, continuous response of the ego vehicle can be ensured. This improves user experience.

For example, when the ego vehicle overtakes a vehicle, the overtaken vehicle is an obstacle outside the target travel route. When the intrusion degree of the obstacle is low, the ego vehicle may appropriately decelerate to overtake the vehicle, to ensure safety. As the intrusion degree of the obstacle increases, the ego vehicle may keep a stable speed or continue to decelerate to avoid collision. The foregoing process is a continuous change process, to avoid a sudden change of a vehicle speed.

In an implementation, when the status of the virtual wall is the impenetrable state, the speed of the towing point may be implemented by reusing a solution of the impenetrable virtual wall in the existing solution.

For example, the speed of the towing point in the existing solution is the tangential speed of the obstacle. In the solution of this application, when the status of the virtual wall is the impenetrable state, the speed of the towing point may be equal to the tangential speed of the obstacle.

In this way, the existing mature algorithm can be reused without making a large quantity of drive tests for re-debugging. This reduces debugging costs.

S730: Obtain expected acceleration of the ego vehicle based on the location of the towing point and the speed of the towing point.

Specifically, the expected acceleration is determined based on a location error and a speed error.

For example, the expected acceleration is a linear combination of the location error and the speed error.

The location error is a difference between the location of the towing point and a current location of the ego vehicle. The speed error is a difference between the speed of the towing point and a current speed of the ego vehicle.

For example, the following distance may be determined in the foregoing manner 2. In this case, the expected acceleration $a_{expected}$ satisfies the following equation:

$$a_{expected} = K_1(V_{towing\ point} - V_{ego\ vehicle}) + K_2(S_{towing\ point} - S_{ego\ vehicle})$$

$K_1$ and $K_2$ are coefficients. For example, $K_1$ and $K_2$ may be determined based on drive test experience. A value range of $K_1$ is (0, 10]. A value range of $K_2$ is (0, 10].

For example, $K_1=1.0$, and $K_2=0.1$. $S_{towing\ point}$ indicates the location of the towing point, and $S_{ego\ vehicle}$ indicates the location of the ego vehicle. For example, the location may be represented by using an S-axis coordinate in a Frenet coordinate system. The S-axis coordinate may also be referred to as an arc length coordinate.

For example, the expected acceleration $a_{expected}$ may alternatively be determined based on the collision risk degree, the location error, and the speed error.

For example, the following distance is determined in the foregoing manner 1. In this case, when the collision risk degree (risk) is greater than or equal to the first threshold, the expected acceleration $a_{expected}$ may satisfy the following equation:

$$a_{expected} = K_1(V_{towing\ point} - V_{ego\ vehicle}) + K_2(S_{towing\ point} - S_{ego\ vehicle})$$

In an implementation, when the collision risk degree is greater than or equal to the first threshold, the status of the virtual wall is the impenetrable state, and the expected acceleration may be calculated by reusing the existing solution, for example, by using the foregoing equation.

When the collision risk degree (risk) is less than the first threshold, the following distance and the collision risk degree (risk) may satisfy the following equation:

$$a_{expected} = K_1(V_{towing\ point} - V_{ego\ vehicle}) + \max(K_2(S_{towing\ point} - S_{ego\ vehicle}), 0)$$

The foregoing equation may be understood as follows: When the collision risk degree (risk) is less than the first threshold, the status of the virtual wall is the penetrable state. If the location of the towing point is located in front of the ego vehicle, namely, if the ego vehicle does not arrive at the location of the towing point, the expected acceleration is calculated based on the location error between the towing point and the ego vehicle and the speed error between the speed of the towing point and the speed of the ego vehicle, and the ego vehicle is driven to the location of the towing point. If the location of the towing point is located at the rear of the ego vehicle, namely, if the ego vehicle has arrived at the location of the towing point, and the latter term in the foregoing equation is 0, the expected acceleration is obtained based on the speed error between the speed of the towing point and the speed of the ego vehicle, and the ego vehicle is driven to penetrate through the virtual wall.

The expected acceleration may be output to a longitudinal planning module. The longitudinal planning module may be configured to obtain a target vehicle speed.

Generally, the virtual wall is an impenetrable virtual wall. When the ego vehicle detects that the location of the obstacle frequently changes near a wall adding critical point, the virtual wall may be unstable and changes between being set and being not set, discontinuously affecting the speed of the ego vehicle and resulting in a sudden change of the speed of the ego vehicle.

According to the solution in this embodiment of this application, both the location of the towing point and the speed of the towing point are the continuous functions of the motion status of the obstacle. After the obstacle is detected or the motion status of the obstacle is obtained, a speed constraint can be continuously provided for the vehicle. The location and the speed of the towing point continuously change with the motion status of the obstacle, to avoid a sudden change of the location and the speed of the towing point caused by impact such as perceived noise. Therefore, frequent acceleration or deceleration of the vehicle can be avoided. This improves user experience.

In the existing solution, the impenetrable virtual wall is usually set in a dangerous scenario, for example, in a case of a short horizontal vehicle distance, so that collision easily occurs, or sudden deceleration easily occurs, affecting user experience. According to the solution in this embodiment of this application, after the obstacle is detected or the motion status of the obstacle is obtained, the speed constraint can be continuously provided for the vehicle. In this way, in a dangerous scenario, the ego vehicle can respond as soon as possible, to avoid collision or impact on user experience. For example, after the obstacle is detected or the motion status of the obstacle is obtained, the location and the speed of the towing point are determined, and the speed constraint is continuously provided for the vehicle, instead of being provided only in a case of a short vehicle distance. In this way, the vehicle may decelerate in advance before a dangerous scenario occurs. This improves passenger safety.

In addition, the status of the virtual wall in this embodiment of this application includes the penetrable state and the impenetrable state. As described above, the method may be applied to a cut-in scenario. The cut-in scenario refers to a scenario in which the obstacle enters the lane of the ego vehicle. The virtual wall can be in different states at different intrusion degrees. For example, for an obstacle with a low intrusion degree, the virtual wall is in the penetrable state, and the ego vehicle may perform preventive deceleration. As the intrusion degree increases, the virtual wall is switched to the impenetrable state, to ensure driving safety of the ego vehicle. Because the ego vehicle has already decelerated in advance, taking over by a driver in a cut-in emergency can be avoided, or sudden deceleration is avoided. This improves user experience.

In addition, in the solution in this embodiment of this application, at a high risk degree, the virtual wall is in the impenetrable state, and is equivalent to an impenetrable virtual wall. This solution may be compatible with a conventional impenetrable virtual wall solution. In this way, the existing mature algorithm may be reused without making a large quantity of drive tests for re-debugging. This reduces debugging costs.

Figure 11:
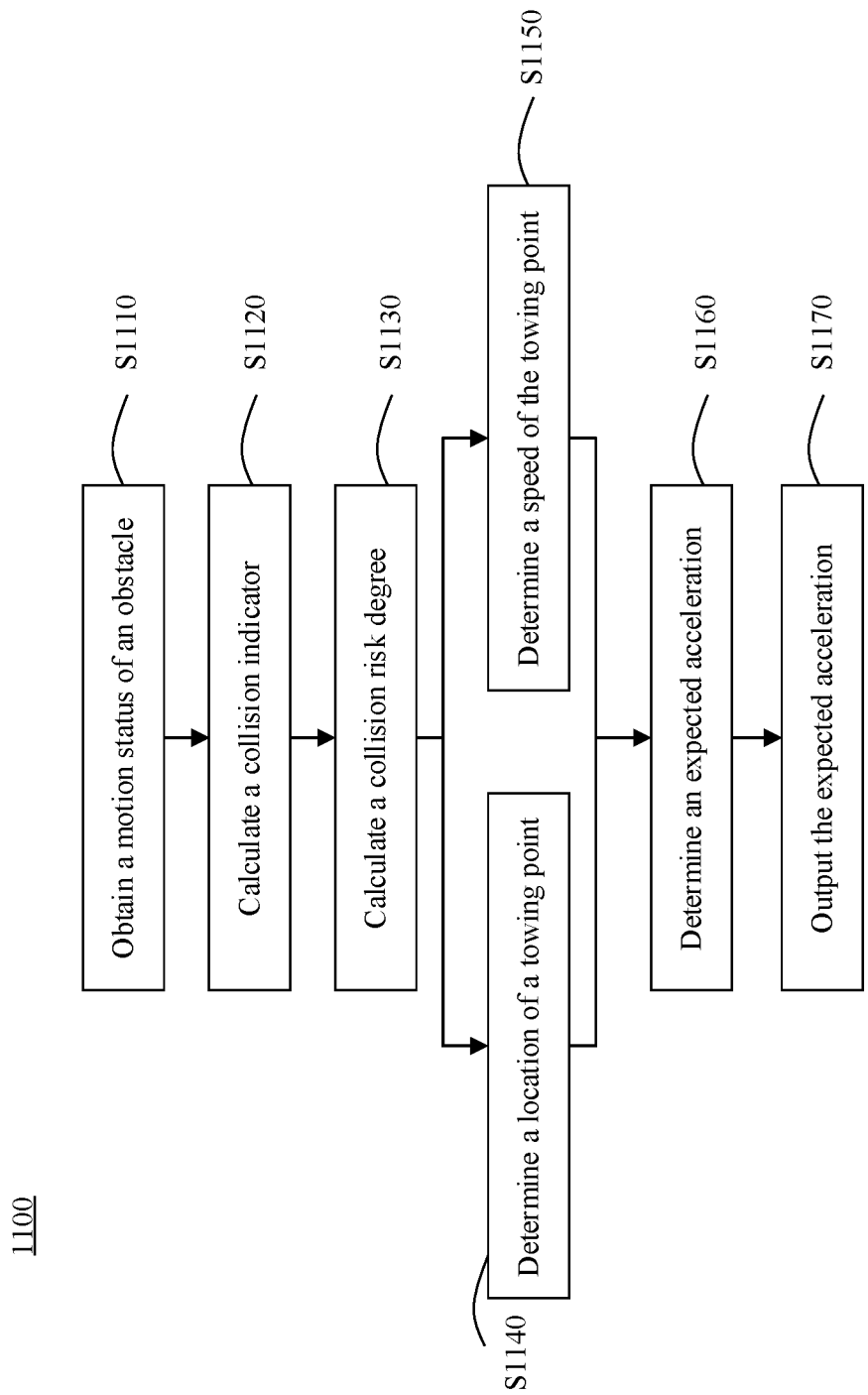
FIG. 11 is a schematic flowchart of an autonomous driving method according to an embodiment of this application.

FIG. 11 shows an autonomous driving method 1100 according to an embodiment of this application. The method 1100 may be considered as an implementation of the method 700. To avoid unnecessary repetition, repeated descriptions are appropriately omitted when the method 1100 is described below. The method 1100 includes step S1110 to step S1170. The following describes step S1110 to step S1170.

S1110: Obtain a motion status of an obstacle.

For example, the motion status of the obstacle includes a speed of the obstacle and a location of the obstacle.

The motion status of the obstacle may be obtained by using a perception fusion module.

Further, step S1110 further includes a target travel route of an ego vehicle.

For example, the obstacle is located in a side front area of the target travel route.

The target travel route of the ego vehicle may be obtained by using a horizontal planning module.

Step S1110 corresponds to step S710 in the method 700. For specific descriptions, refer to the foregoing method 700. Details are not described herein again.

S1120: Calculate a collision indicator.

The collision indicator is calculated based on the motion status of the obstacle.

For example, the collision indicator includes any one or more of the following: distance to lane DTL, time to lane TTL, and distance to vehicle DTV.

S1130: Calculate a collision risk degree.

The collision risk degree is calculated based on the collision indicator.

For example, the collision risk degree (risk) may satisfy the following equation:

$$risk=0.3*(2.0-DTL)+0.3*(1.0-TTL)+0.4*(2.5-DTV)$$

The collision risk degree has a negative correlation with DTL, TTL, and DTV. In other words, higher DTL, TTL, and DTV indicates a lower collision risk degree and a lower possibility of collision.

S1140: Determine a location of a towing point.

For example, the location of the towing point may be represented by a following distance. The following distance is a continuous function of the collision risk degree. For example, the following distance may be a positive number, zero, or a negative number. In some implementations, if the following distance is a positive number, it indicates that the location of the towing point is located at the rear of a virtual wall; if the following distance is zero, it indicates that the towing point is located at a virtual wall; or if the following distance is a negative number, it indicates that the location of the towing point is located in front of a virtual wall. In this case, the following distance has a positive correlation with the collision risk degree.

For example, the following distance and the collision risk degree (risk) may be determined in Manner 1.

$$\text{Following distance} = \text{ego vehicle speed} * (2.4 * risk - 1.2)$$

In Manner 1, the following distance is a monotonically increasing function of the collision risk degree. The second threshold is 0.5. When the collision risk degree is less than 0.5, the following distance is a positive number, and the towing point is located in front of the virtual wall. When the collision risk degree is greater than 0.5, the following distance is a negative number, and the towing point is located at the rear of the virtual wall. When the collision risk degree is equal to 0.5, the following distance is 0, and the towing point is located at the virtual wall.

For another example, the following distance and the collision risk degree (risk) may be determined in Manner 2.

When the collision risk degree (risk) is greater than or equal to the first threshold, the following distance and the collision risk degree (risk) may satisfy the following equation:

Following distance=ego vehicle speed*(2.4*risk−1.2)

When the collision risk degree (risk) is less than the first threshold, the following distance and the collision risk degree (risk) may satisfy the following equation:

Following distance=min(ego vehicle speed*(2.4*risk−1.2),d)

d represents the distance between the ego vehicle and the virtual wall.

In Manner 2, if the collision risk degree is less than 1, the following distance is a piecewise function. The piecewise function may be understood as follows: Before the ego vehicle arrives at the location indicated by the former term in the foregoing equation, namely, when the former term in the foregoing equation is less than the latter term in the foregoing equation, the following distance is the monotonically increasing function of the risk degree. After the ego vehicle arrives at the location indicated by the former term, namely, when the former term in the foregoing equation is greater than the latter term, the following distance is the distance between the ego vehicle and the virtual wall. Continuity is maintained in the entire process, and the virtual wall is in the penetrable state. When the collision risk degree is greater than or equal to 1, the following distance is the monotonically increasing function of the risk degree, and the virtual wall is in the impenetrable state.

S1150: Determine a speed of the towing point.

For example, the speed of the towing point is determined based on a tangential speed of the obstacle and a penetration speed of the ego vehicle.

For example, the speed of the towing point is equal to a sum of the tangential speed of the obstacle and the penetration speed of the ego vehicle. The speed $V_{towing\ point}$ of the towing point satisfies the following equation:

$V_{towing\ point} = V_{tangential} + V_{penetration}$

The penetration speed of the ego vehicle has a negative correlation with the collision risk degree. In other words, a higher collision risk degree indicates a lower penetration speed of the ego vehicle.

For example, the penetration speed of the ego vehicle may satisfy the following equation:

$V_{penetration} = \max(25*(1-risk), 0)$

In the foregoing equation for calculating the penetration speed of the ego vehicle, the penetration speed of the ego vehicle is a nonnegative monotonically decreasing function of the collision risk degree, and the penetration speed of the ego vehicle is a nonnegative number. The second threshold is 1. When the collision risk degree is 0, the penetration speed of the ego vehicle is 25 m/s. When the collision risk degree is less than 1, the penetration speed of the ego vehicle is greater than 0, the speed of the towing point is greater than the tangential speed of the obstacle, and the status of the virtual wall is the penetrable state. When the collision risk degree is greater than or equal to 1, the penetration speed of the ego vehicle is 0, and the speed of the towing point is equal to the tangential speed of the obstacle. In this case, the status of the virtual wall is the impenetrable state.

Steps S1120 to S1150 correspond to step S720 in the method 700. For specific descriptions, refer to the foregoing method 700. Details are not described herein again.

S1160: Determine expected acceleration.

Specifically, the expected acceleration is determined based on a location error and a speed error.

For example, the expected acceleration is a linear combination of the location error and the speed error.

The location error is a difference between the location of the towing point and a current location of the ego vehicle. The speed error is a difference between the speed of the towing point and a current speed of the ego vehicle.

For example, the following distance may be determined in the foregoing manner 2. In this case, the expected acceleration $a_{expected}$ satisfies the following equation:

$a_{expected} = K_1(V_{towing\ point} - V_{ego\ vehicle}) + K_2(S_{towing\ point} - S_{ego\ vehicle})$ $K_1$ and $K_2$ are coefficients. For example, $K_1$ and $K_2$ may be determined based on drive test experience. For example, $K_{1=1.0}$, and $K_{2=0.1}$. $S_{towing\ point}$ indicates the location of the towing point, and $S_{ego\ vehicle}$ indicates the location of the ego vehicle.

For example, the expected acceleration $a_{expected}$ may alternatively be determined based on the collision risk degree, the location error, and the speed error.

For example, the following distance is determined in the foregoing manner 1. In this case, when the collision risk degree (risk) is greater than or equal to the first threshold, the expected acceleration $a_{expected}$ may satisfy the following equation:

$a_{expected} = K_1(V_{towing\ point} - V_{ego\ vehicle}) + K_2(S_{towing\ point} - S_{ego\ vehicle})$ When the collision risk degree (risk) is less than the first threshold, the following distance and the collision risk degree (risk) may satisfy the following equation:

$a_{expected} = K_1(V_{towing\ point} - V_{ego\ vehicle}) + \max(K_2(S_{towing\ point} - S_{ego\ vehicle}), 0)$ The foregoing equation may be understood as follows: When the collision risk degree (risk) is less than the first threshold, the status of the virtual wall is the penetrable state. If the location of the towing point is located in front of the ego vehicle, namely, if the ego vehicle does not arrive at the location of the towing point, the expected acceleration is calculated based on the location error and the speed error, and the ego vehicle is driven to the location of the towing point. If the location of the towing point is located at the rear of the ego vehicle, namely, if the ego vehicle has arrived at the location of the towing point, and the latter term in the foregoing equation is 0, the expected acceleration is obtained based on the speed error, and the ego vehicle is driven to penetrate through the virtual wall.

Step S1160 corresponds to step S730 in the method 700. For specific descriptions, refer to the foregoing method 700. Details are not described herein again.

S1170: Output the expected acceleration.

The expected acceleration may be output to a longitudinal planning module. The longitudinal planning module may be configured to obtain a target vehicle speed.

According to the solution in this embodiment of this application, both the location of the towing point and the speed of the towing point are the continuous functions of the motion status of the obstacle. After the obstacle is detected or the motion status of the obstacle is obtained, a speed constraint can be continuously provided for the vehicle. The location and the speed of the towing point continuously change with the motion status of the obstacle, to avoid a sudden change of the location and the speed of the towing point caused by impact such as perceived noise. Therefore, frequent acceleration or deceleration of the vehicle can be avoided. This improves user experience.

Figure 12:
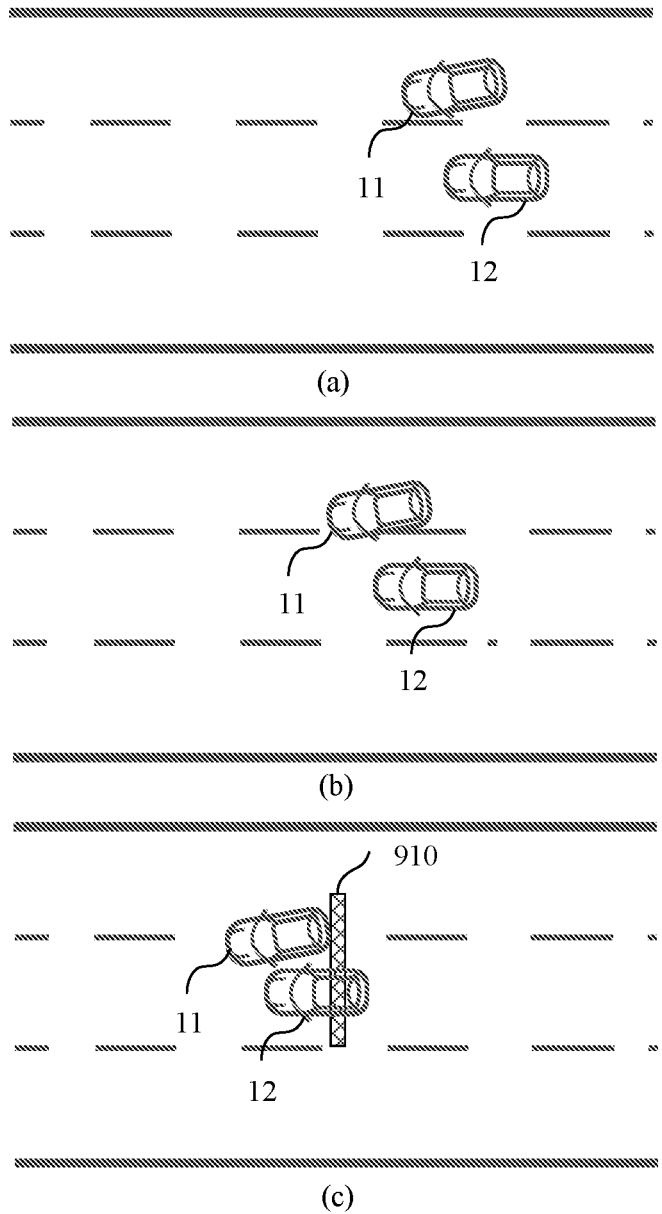
FIG. 12 is a schematic diagram of driving a vehicle in an existing solution in a case of lateral vehicle blocking.

FIG. 12 and FIG. 13 are respectively schematic diagrams of effects of using an existing solution and a solution in this application when another vehicle in a lateral direction enters a lane of the ego vehicle.

A virtual wall used in the existing solution is an impenetrable virtual wall. In other words, after the wall is added, the ego vehicle needs to keep a safe distance from the virtual wall. As shown in FIG. 12, another vehicle 11 performs a lateral extrusion action toward an ego vehicle 12. It may be learned from (a) to (c) in FIG. 12 that the another vehicle 11 gradually intrudes a lane of the ego vehicle 12. As shown in (a) in FIG. 12, the another vehicle 11 does not intrude into the lane of the ego vehicle, or in other words, a horizontal distance between the ego vehicle 12 and the another vehicle 11 is greater than a specified threshold. In the existing solution, usually no virtual wall is added. In (b) in FIG. 12, an intrusion degree of the another vehicle 11 is not high, or a horizontal distance between the ego vehicle 12 and the another vehicle 11 is greater than a specified threshold. In the existing solution, usually no virtual wall is added, and the ego vehicle can appropriately travel. However, in (c) in FIG. 12, the another vehicle has intruded into the lane of the ego vehicle 12, an intrusion degree is high, and a horizontal distance between the ego vehicle 12 and the another vehicle 11 is less than a specified threshold. In this case, in the existing solution, a virtual wall 910 is added, and the virtual wall 910 is an impenetrable virtual wall. However, as shown in (c) in FIG. 12, when the virtual wall 910 is added, collision may occur, or sudden deceleration is required, or a driver needs to urgently take over the ego vehicle, seriously affecting passenger safety and user experience.

According to the solution in this embodiment of this application, the virtual wall can be added in advance. The virtual wall includes the penetrable state and the impenetrable state. Deceleration is performed in advance without affecting driving of the ego vehicle. This improves passenger safety and comfort.

As shown in FIG. 13, another vehicle 11 performs a lateral extrusion action toward an ego vehicle 12. It may be learned from (a) to (c) in FIG. 13 that the another vehicle 11 gradually intrudes into a lane of the ego vehicle 12. As shown in (a) in FIG. 13, the another vehicle 11 does not intrude into the lane of the ego vehicle. In the solution in this embodiment of this application, a virtual wall 901 is set, and the virtual wall 901 includes a penetrable state and an impenetrable state. A status of the virtual wall 901 changes with an intrusion degree of the another vehicle 11. In (b) in FIG. 13, an intrusion degree of the another vehicle 11 increases compared with that in (a), and the status of the virtual wall 901 gradually changes to the impenetrable state. In (c) in FIG. 13, the another vehicle has intruded into the lane of the ego vehicle 12, an intrusion degree is high, and the virtual wall 901 is in the impenetrable state. In FIG. 13, when the another vehicle 11 is detected, the virtual wall 901 may be set, and the ego vehicle decelerates in advance. This improves passenger safety and comfort.

FIG. 14 is a schematic diagram of an effect of a solution of this application when there is noise at a location of another vehicle.

In the existing solution, when there is noise at the location of the another vehicle, the location of the another vehicle detected by the ego vehicle may change at a critical location between being set and being not set. As a result, the virtual wall is unstable, and the ego vehicle frequently accelerates and decelerates. It should be noted that FIG. 14 is only a schematic diagram of a location change state of the another vehicle detected by an ego vehicle, and does not represent an actual location of the another vehicle 11.

The location of the another vehicle 11 obtained by the ego vehicle 12 is shown in FIG. 14, and the another vehicle 11 is near a lane line. As shown in (a) in FIG. 14, when the ego vehicle 12 detects the another vehicle 11, a virtual wall 901 is set. A status of the virtual wall 901 includes a penetrable state and an impenetrable state. As shown in (b) in FIG. 14, an intrusion degree of the another vehicle 11 is low, the virtual wall 901 is in the penetrable state, and the ego vehicle 12 penetrates through the virtual wall 901. In (c) in FIG. 14, the ego vehicle 12 continues to travel. In a driving process in FIG. 14, the ego vehicle may keep a stable speed, and pass by the another vehicle 11 smoothly.

Figure 15:
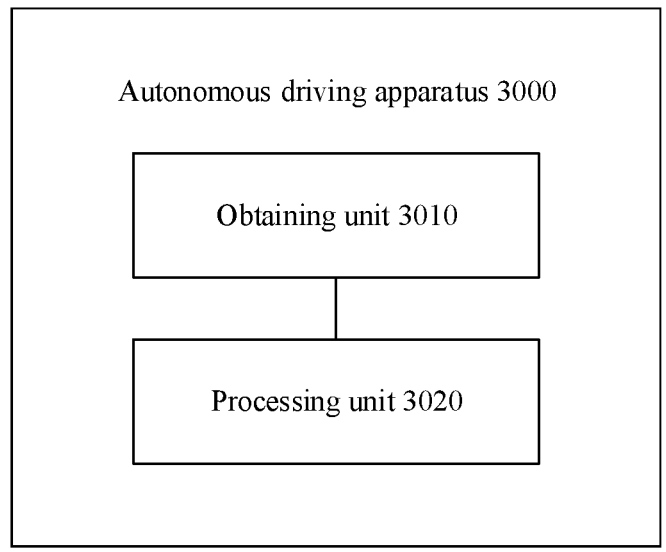
FIG. 15 is a schematic block diagram of an autonomous driving apparatus according to an embodiment of this application.

FIG. 15 is a schematic block diagram of an autonomous driving apparatus 3000 according to an embodiment of this application. The autonomous driving apparatus 3000 shown in FIG. 15 includes an obtaining unit 3010 and a processing unit 3020.

The obtaining unit 3010 and the processing unit 3020 may be configured to perform the autonomous driving method in embodiments of this application, for example, may be configured to perform the method 700 or the method 1100.

The obtaining unit 3010 is configured to obtain a motion status of an obstacle. The motion status of the obstacle includes a location of the obstacle and a speed of the obstacle. The processing unit 3020 is configured to: determine a location of a towing point and a speed of the towing point based on the motion status of the obstacle, where the speed of the towing point indicates an expected speed of an ego vehicle at the location of the towing point, the location of the towing point is a continuous function of the motion status of the obstacle, and the speed of the towing point is a continuous function of the motion status of the obstacle; and obtain expected acceleration of the ego vehicle based on the location of the towing point and the speed of the towing point.

Optionally, in an embodiment, the processing unit 3020 is specifically configured to: generate a virtual wall based on the location of the obstacle. A status of the virtual wall includes a penetrable state and an impenetrable state.

Optionally, in an embodiment, the virtual wall continuously exists.

Optionally, in an embodiment, the obtaining unit 3010 is further configured to obtain a target travel route of the ego vehicle. The processing unit 3020 is specifically configured to determine the location of the towing point and the speed of the towing point based on the motion status of the obstacle and the target travel route of the ego vehicle.

Optionally, in an embodiment, the location of the towing point is represented by a following distance.

Optionally, in an embodiment, an update frequency of the expected acceleration is greater than or equal to 20 Hz.

Optionally, in an embodiment, the processing unit 3020 is specifically configured to: calculate a collision risk degree based on the motion status of the obstacle; and determine a location of a towing point and a speed of the towing point based on the collision risk degree.

Optionally, in an embodiment, when the collision risk degree is less than a first threshold, the status of the virtual wall is the penetrable state; or when the collision risk degree is greater than or equal to a first threshold, the status of the virtual wall is the impenetrable state.

Optionally, in an embodiment, the speed of the obstacle includes a tangential speed of the obstacle. The processing unit 3020 is specifically configured to: determine a penetration speed of the ego vehicle based on the collision risk degree, where the penetration speed of the ego vehicle has a negative correlation with the collision risk degree; and determine the speed of the towing point based on the tangential speed of the obstacle and the penetration speed of the ego vehicle.

Optionally, in an embodiment, the processing unit 3020 is specifically configured to: when the collision risk degree is greater than or equal to the first threshold, the speed of the towing point is less than or equal to the tangential speed of the obstacle.

Optionally, in an embodiment, the processing unit 3020 is specifically configured to: calculate a collision indicator based on the motion status of the obstacle, where the collision indicator includes at least one or more of the following: distance to lane, time to lane, and distance to vehicle; and calculate the collision risk degree based on the collision indicator.

Optionally, in an embodiment, the processing unit 3020 is further configured to control a vehicle-mounted display to display a location relationship between the ego vehicle, the obstacle, and the virtual wall.

It should be noted that the apparatus 3000 is embodied in a form of a functional unit. The term "unit" herein may be implemented in a form of software and/or hardware. This is not specifically limited.

For example, the "unit" may be a software program, a hardware circuit, or a combination thereof for implementing the foregoing function. The hardware circuit may include an application-specific integrated circuit (application-specific integrated circuit, ASIC), an electronic circuit, a processor (for example, a shared processor, a dedicated processor, or a group processor) and a memory that are configured to execute one or more software or firmware programs, a merged logic circuit, and/or another suitable component that supports the described functions.

Therefore, the units in the examples described in this embodiment of this application can be implemented by using electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

Figure 16:
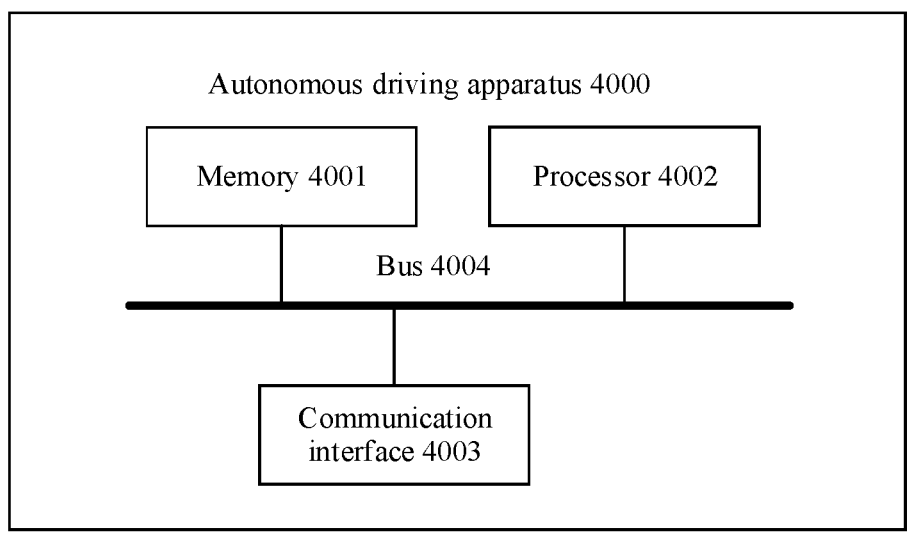
FIG. 16 is a schematic diagram of a structure of hardware of an autonomous driving apparatus according to an embodiment of this application.

FIG. 16 is a schematic diagram of a structure of hardware of an autonomous driving apparatus according to an embodiment of this application. The autonomous driving apparatus 4000 shown in FIG. 16 (the apparatus 4000 may be specifically a computer device) includes a memory 4001, a processor 4002, a communication interface 4003, and a bus 4004. The memory 4001, the processor 4002, and the communication interface 4003 are communicatively connected to each other through the bus 4004.

The memory 4001 may be a read-only memory (read-only memory, ROM), a static storage device, a dynamic storage device, or a random access memory (random access memory, RAM). The memory 4001 may store a program. When the program stored in the memory 4001 is executed by the processor 4002, the processor 4002 is configured to perform the steps of the autonomous driving method in this embodiment of this application. Specifically, the processor 4002 may perform step S710 to step S730 in the foregoing method shown in FIG. 7.

The processor 4002 may use a general-purpose central processing unit (central processing unit, CPU), a microprocessor, an application-specific integrated circuit (application-specific integrated circuit, ASIC), a graphics processing unit (graphics processing unit, GPU), or one or more integrated circuits, and is configured to execute a related program, to implement the autonomous driving method in the method embodiments of this application.

The processor 4002 may alternatively be an integrated circuit chip and has a signal processing capability. In an implementation process, the steps of the autonomous driving method in this application may be completed by using a hardware integrated logic circuit in the processor 4002 or instructions in a form of software.

The processor 4002 may alternatively be a general-purpose processor, a digital signal processor (digital signal processor, DSP), an application-specific integrated circuit (ASIC), a field programmable gate array (field programmable gate array, FPGA) or another programmable logic device, a discrete gate or transistor logic device, or a discrete hardware component. The methods, the steps, and logical block diagrams that are disclosed in embodiments of this application may be implemented or performed. The general-purpose processor may be a microprocessor, or the processor may be any conventional processor, or the like. Steps of the methods disclosed with reference to embodiments of this application may be directly executed and accomplished by using a hardware decoding processor, or may be executed and accomplished by using a combination of hardware and software modules in the decoding processor. The software module may be located in a storage medium mature in the art, such as a random access memory, a flash memory, a read-only memory, a programmable read-only memory, an electrically erasable programmable memory, or a register. The storage medium is located in the memory 4001. The processor 4002 reads information in the memory 4001, and completes, in combination with hardware of the processor 4002, a function that needs to be executed by a unit included in the autonomous driving apparatus in this embodiment of this application, or performs the autonomous driving method in embodiments of this application.

The communication interface 4003 uses a transceiver apparatus, for example but not limited to, a transceiver, to implement communication between the apparatus 4000 and another device or a communication network. For example, the motion status of the obstacle may be obtained through the communication interface 4003.

The bus 4004 may include a path for transmitting information between components (for example, the memory 4001, the processor 4002, and the communication interface 4003) of the apparatus 4000.

It should be noted that although only the memory, the processor, and the communication interface in the apparatus 4000 are illustrated, in a specific implementation process, a person skilled in the art should understand that the apparatus 4000 may further include another component necessary for appropriate running. In addition, based on a specific requirement, a person skilled in the art should understand that the apparatus 4000 may further include a hardware component for implementing another additional function. In addition, a person skilled in the art should understand that the apparatus 4000 may include only components necessary for implementing embodiments of this application, but not necessarily include all the components shown in FIG. 16.

Figure 17:
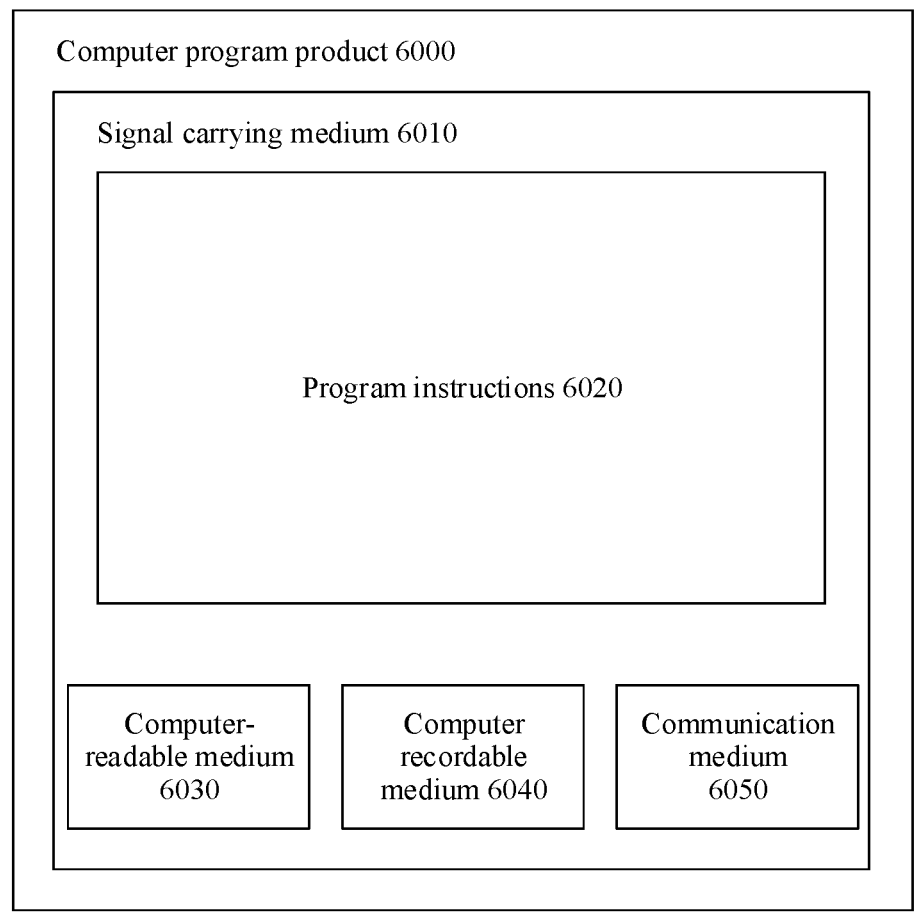
FIG. 17 is a schematic diagram of a structure of a computer program product according to an embodiment of this application.

In some embodiments, the disclosed methods may be implemented as computer program instructions encoded in a machine-readable format on a computer-readable storage medium or encoded on another non-transitory medium or product. FIG. 17 schematically shows a conceptual partial view of an example computer program product arranged according to at least some of embodiments shown herein. The example computer program product includes a computer program for executing a computer process on a computing device. In an embodiment, the example computer program product 6000 is provided by using a signal carrying medium 6010. The signal carrying medium 6010 may include one or more program instructions 6020. When the program instructions 6020 are run by one or more processors, the program instructions 6020 may provide functions or some functions described in FIG. 7 or FIG. 11. Therefore, for example, refer to the embodiment shown in FIG. 7, one or more features of the method 700 may be borne by one or more instructions associated with the signal carrying medium 6010. In addition, the program instructions 6020 in FIG. 17 also describe example instructions.

In some examples, the signal carrying medium 6010 may include a computer-readable medium 6030, for example, but not limited to, a hard disk drive, a compact disc (CD), a digital video disc (DVD), a digital tape, a memory, a read-only memory (read-only memory, ROM), or a random access memory (random access memory, RAM). In some implementations, the signal carrying medium 6010 may include a computer recordable medium 6040, for example, but not limited to, a memory, a read/write (R/W) CD, or an R/W DVD. In some implementations, the signal carrying medium 6010 may include a communication medium 6050, for example, but not limited to, a digital and/or analog communication medium (for example, an optical fiber cable, a waveguide, a wired communication link, or a wireless communication link). Therefore, for example, the signal carrying medium 6010 may be conveyed by a wireless communication medium 6050 (for example, a wireless communication medium that complies with the IEEE 802.11 standard or another transmission protocol). The one or more program instructions 6020 may be, for example, computer-executable instructions or logic implementation instructions. In some examples, the computing device in FIG. 2 to FIG. 5 may be configured to provide various operations, functions, or actions in response to the program instructions 6020 transmitted to the computing device by using one or more of the computer-readable medium 6030, the computer recordable medium 6040, and/or the communication medium 6050. It should be understood that the arrangement described herein is merely used as an example. Thus, a person skilled in the art appreciates that another arrangement and another element (for example, a machine, an interface, a function, a sequence, and an array of functions) can be used to replace the arrangement, and some elements may be omitted together depending on a desired result. In addition, many of the described elements are functional entities that can be implemented as discrete or distributed components, or implemented in any suitable combination at any suitable position in combination with another component.

It should be understood that, the processor in this embodiment of this application may be a central processing unit (central processing unit, CPU). The processor may be further another general-purpose processor, a digital signal processor (digital signal processor, DSP), an application-specific integrated circuit (application-specific integrated circuit, ASIC), a field programmable gate array (field programmable gate array, FPGA), or another programmable logic device, discrete gate or transistor logic device, discrete hardware component, or the like. The general-purpose processor may be a microprocessor, or the processor may be any conventional processor, or the like.

It should be further understood that the memory in this embodiment of this application may be a volatile memory or a nonvolatile memory, or may include the volatile memory and the nonvolatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), which is used as an external cache. By way of example but not limitative description, many forms of random access memories (random access memories, RAMs) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM).

All or some of the foregoing embodiments may be implemented by using software, hardware, firmware, or any combination thereof. When the software is used for implementing embodiments, all or some of the foregoing embodiments may be implemented in a form of a computer program product. The computer program product includes one or more computer instructions or computer programs. When the computer instructions or the computer programs are loaded or executed on a computer, the procedures or functions according to embodiments of this application are completely or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects and represents that three relationships may exist. For example, A and/or B may represent the following three cases: only A exists, both A and B exist, and only B exists. A and B may be singular or plural. In addition, the character "/" in this specification usually represents an "or" relationship between the associated objects, or may represent an "and/or" relationship. A specific meaning depends on a context.

In this application, "at least one" means one or more, and "a plurality of" means two or more. "At least one of the following items (pieces)" or a similar expression thereof indicates any combination of these items, including any combination of a single item (piece) or a plurality of items (pieces). For example, at least one item (piece) of a, b, or c may indicate a, b, c, a and b, a and c, b and c, or a, b, and c, where a, b, and c may be singular or plural.

It should be understood that, in embodiments of this application, sequence numbers of the foregoing processes do not mean execution sequences. The execution sequences of the processes should be determined based on functions and internal logic of the processes, and should not constitute any limitation on implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one location, or may be distributed on a plurality of network units. Some or all of the units may be selected based on actual requirements to achieve the objective of the solutions of embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes various media that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
    obtaining a motion status of an obstacle, wherein the motion status of the obstacle comprises a location of the obstacle and a speed of the obstacle;
    determining a location of a towing point and a speed of the towing point based on the motion status of the obstacle, wherein the speed of the towing point indicates an expected speed of an ego vehicle at the location of the towing point, the location of the towing point is a continuous function of the motion status of the obstacle, and the speed of the towing point is a continuous function of the motion status of the obstacle;
    obtaining expected acceleration of the ego vehicle based on the location of the towing point and the speed of the towing point; and
    generating a virtual wall based on the location of the obstacle, wherein the virtual wall is located at a tail of the obstacle, the virtual wall extends through a lane of the ego vehicle, and the virtual wall is perpendicular to a direction of the lane.

2. The method according to claim 1, wherein:
    a status of the virtual wall comprises a penetrable state and an impenetrable state.

3. The method according to claim 2, wherein the virtual wall continuously exists.

4. The method according to claim 1, wherein the method further comprises:
    obtaining a target travel route of the ego vehicle; and
    the determining a location of a towing point and a speed of the towing point based on the motion status of the obstacle comprises:
    determining the location of the towing point and the speed of the towing point based on the motion status of the obstacle and the target travel route of the ego vehicle.

5. The method according to claim 1, wherein the location of the towing point is represented by a following distance.

6. The method according to claim 1, wherein an update frequency of the expected acceleration is greater than or equal to 20 Hz.

7. The method according to claim 2, wherein the determining a location of a towing point and a speed of the towing point based on the motion status of the obstacle comprises:
    calculating a collision risk degree based on the motion status of the obstacle; and
    determining the location of the towing point and the speed of the towing point based on the collision risk degree.

8. The method according to claim 7, wherein in response to at least that the collision risk degree is less than a first threshold, the status of the virtual wall is the penetrable state; or in response to at least that the collision risk degree is greater than or equal to the first threshold, the status of the virtual wall is the impenetrable state.

9. The method according to claim 7, wherein the speed of the obstacle comprises a tangential speed of the obstacle, and the determining the location of the towing point and the speed of the towing point based on the collision risk degree comprises:
determining a penetration speed of the ego vehicle based on the collision risk degree, wherein the penetration speed of the ego vehicle has a negative correlation with the collision risk degree; and
determining the speed of the towing point based on the tangential speed of the obstacle and the penetration speed of the ego vehicle.

10. The method according to claim 9, wherein the determining the location of the towing point and the speed of the towing point based on the collision risk degree comprises:
in response to at least that the collision risk degree is greater than or equal to a first threshold, the speed of the towing point is less than or equal to the tangential speed of the obstacle.

11. The method according to claim 7, wherein the calculating a collision risk degree based on the motion status of the obstacle comprises:
calculating a collision indicator based on the motion status of the obstacle, wherein the collision indicator comprises at least one of the following: distance to lane, time to lane, or distance to vehicle; and
calculating the collision risk degree based on the collision indicator.

12. The method according to claim 2, wherein the method further comprises:
controlling a vehicle-mounted display to display a location relationship between the ego vehicle, the obstacle, and the virtual wall.

13. An apparatus, comprising:
at least one processor; and
at least one memory coupled to the at least one processor and storing programming instructions for execution by the at least one processor to cause the apparatus to:
obtain a motion status of an obstacle, wherein the motion status of the obstacle comprises a location of the obstacle and a speed of the obstacle; determine a location of a towing point and a speed of the towing point based on the motion status of the obstacle, wherein the speed of the towing point indicates an expected speed of an ego vehicle at the location of the towing point, the location of the towing point is a continuous function of the motion status of the obstacle, and the speed of the towing point is a continuous function of the motion status of the obstacle;
obtain expected acceleration of the ego vehicle based on the location of the towing point and the speed of the towing point; and
generate a virtual wall based on the location of the obstacle, wherein the virtual wall is located at a tail of the obstacle, the virtual wall extends through a lane of the ego vehicle, and the virtual wall is perpendicular to a direction of the lane.

14. The apparatus according to claim 13, wherein a status of the virtual wall comprises a penetrable state and an impenetrable state.

15. The apparatus according to claim 13, wherein the programming instructions are for execution by the at least one processor to further cause the apparatus to:
obtain a target travel route of the ego vehicle; and
determine the location of the towing point and the speed of the towing point based on the motion status of the obstacle and the target travel route of the ego vehicle.

16. The apparatus according to claim 13, wherein the location of the towing point is represented by a following distance.

17. The apparatus according to claim 13, wherein an update frequency of the expected acceleration is greater than or equal to 20 Hz.

18. A non-transitory computer-readable storage medium storing programming instructions for execution by at least one processor of an autonomous driving apparatus to cause the autonomous driving apparatus to:
obtain a motion status of an obstacle, wherein the motion status of the obstacle comprises a location of the obstacle and a speed of the obstacle;
determine a location of a towing point and a speed of the towing point based on the motion status of the obstacle, wherein the speed of the towing point indicates an expected speed of an ego vehicle at the location of the towing point, the location of the towing point is a continuous function of the motion status of the obstacle, and the speed of the towing point is a continuous function of the motion status of the obstacle;
obtain expected acceleration of the ego vehicle based on the location of the towing point and the speed of the towing point; and
generate a virtual wall based on the location of the obstacle, wherein the virtual wall is located at a tail of the obstacle, extends through a lane of the ego vehicle, and is perpendicular to a direction of the lane.

19. A chip, wherein the chip comprises at least one processor and a data interface, and the at least one processor reads, through the data interface, programming instructions stored in at least one memory, to cause the chip to:
obtain a motion status of an obstacle, wherein the motion status of the obstacle comprises a location of the obstacle and a speed of the obstacle;
determine a location of a towing point and a speed of the towing point based on the motion status of the obstacle, wherein the speed of the towing point indicates an expected speed of an ego vehicle at the location of the towing point, the location of the towing point is a continuous function of the motion status of the obstacle, and the speed of the towing point is a continuous function of the motion status of the obstacle;
obtain expected acceleration of the ego vehicle based on the location of the towing point and the speed of the towing point; and
generate a virtual wall based on the location of the obstacle, wherein the virtual wall is located at a tail of the obstacle, the virtual wall extends through a lane of the ego vehicle, and the virtual wall is perpendicular to a direction of the lane.

* * * * *